United States Patent
Kelly et al.

(10) Patent No.: US 6,608,463 B1
(45) Date of Patent: Aug. 19, 2003

(54) SOLID-OXIDE FUEL CELL SYSTEM HAVING AN INTEGRATED AIR SUPPLY SYSTEM

(75) Inventors: Sean M. Kelly, Churchville, NY (US); Trevor T. Grover, Rushville, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/178,823

(22) Filed: Jun. 24, 2002

(51) Int. Cl.[7] .............................................. H01M 10/44
(52) U.S. Cl. ...................................................... 320/101
(58) Field of Search ............................ 320/101; 429/20, 429/12, 13, 22, 17, 23; 361/600, 622, 676, 678, 679; 62/3.7, 401; 123/696

(56) References Cited

U.S. PATENT DOCUMENTS

| | | | | |
|---|---|---|---|---|
| 4,145,999 A | * | 3/1979 | Aoki ........................... | 123/696 |
| 5,573,867 A | * | 11/1996 | Zafred et al. .................. | 429/17 |
| 5,931,002 A | * | 8/1999 | Nagashima .................. | 361/692 |
| 6,348,278 B1 | * | 2/2002 | LaPierre et al. ............... | 429/17 |
| 6,451,465 B1 | * | 9/2002 | Chalfant et al. ............... | 429/20 |
| 6,475,655 B1 | * | 11/2002 | Nakanishi et al. ............ | 429/19 |

* cited by examiner

Primary Examiner—Edward H. Tso
Assistant Examiner—Pia Tibbits
(74) Attorney, Agent, or Firm—Vincent A. Cichosz

(57) ABSTRACT

A solid-oxide fuel cell system having an integrated air supply system, including a central air pump, distribution manifold, air control valves, mass air flow sensors, and supply ducts, for controllably supplying oxygen for the fuel cell reaction, both through and controllably bypassing cathode air heat exchangers; combustion air for a combustor of tail gas from the anodes; cooling air for electronic controls; and reforming air to a liquid fuel vaporizer integral with a hydrocarbon fuel reformer.

11 Claims, 24 Drawing Sheets

SOLID-OXIDE FUEL CELL SYSTEM HAVING AN INTEGRATED AIR SUPPLY SYSTEM

TECHNICAL FIELD

The present invention relates to hydrogen/oxygen fuel cells having a solid-oxide electrolytic layer separating an anode layer from a cathode layer; more particularly, to fuel cell assemblies and systems comprising a plurality of individual fuel cells in a stack wherein air and reformed fuel are supplied to the stack; and most particularly, to such a fuel cell system including an integrated air supply system, including a central air pump, distribution manifold, air control valves, mass air flow sensors, and supply ducts, for controllably supplying air to all required fuel cell system functions.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells. Because each anode and cathode must have a free space for passage of gas over its surface, the cells are separated by perimeter spacers which are selectively vented to permit flow of gas to the anodes and cathodes as desired but which form seals on their axial surfaces to prevent gas leakage from the sides of the stack. The perimeter spacers may include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. There typically are many gas conduit connections between components in the system. These connections typically are conveying high temperature oxidant gas (air and exhaust) or hydrogen-rich reformate fuel at high temperature. Conventional approaches for conveying these gases include plumbing networks comprising metal tubing, pipes, and fittings. These components often have welded or compression-fitting connections that have the undesirable characteristics of high cost, large size, complexity, and moderate reliability. Typically, each component is directed to a specific function without regard to an overarching system architecture and physical consolidation.

What is needed is a means for reducing the complexity, cost, and size of a solid-oxide fuel cell system by consolidating the auxiliary systems, piping, and connections.

It is a principal object of the present invention to simplify the construction and reduce the cost and size of a solid-oxide fuel cell system.

It is a further object of the invention to increase the reliability and safety of operation of such a fuel cell system.

BRIEF DESCRIPTION OF THE INVENTION

Briefly described, in a solid-oxide fuel cell system, a compact, highly space-efficient fuel/air manifold assembly conveys high temperature air, exhaust, and hydrogen-rich fuel such as, for example, reformate or pure hydrogen, to and from the core components of the system. The manifold is a three-dimensional assembly of plates and shallow partitioned elements which are easily and inexpensively formed. When assembled, the manifold comprises a network of passageways which allow for the mounting, close-coupling, and integration of critical fuel cell system components. An integrated fuel reformer partially oxidizes liquid hydrocarbon fuel catalytically into hydrogen and carbon monoxide and interacts via heat exchangers to controllably add or subtract heat in various gas flows in the system. An integrated air supply system pressurizes atmospheric air for providing oxygen for the fuel cell reaction, both through and controllably bypassing cathode air heat exchangers; combustion air for a combustor of tail gas from the anodes; cooling air for electronic controls; and reforming air to a liquid fuel vaporizer integral with the reformer.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
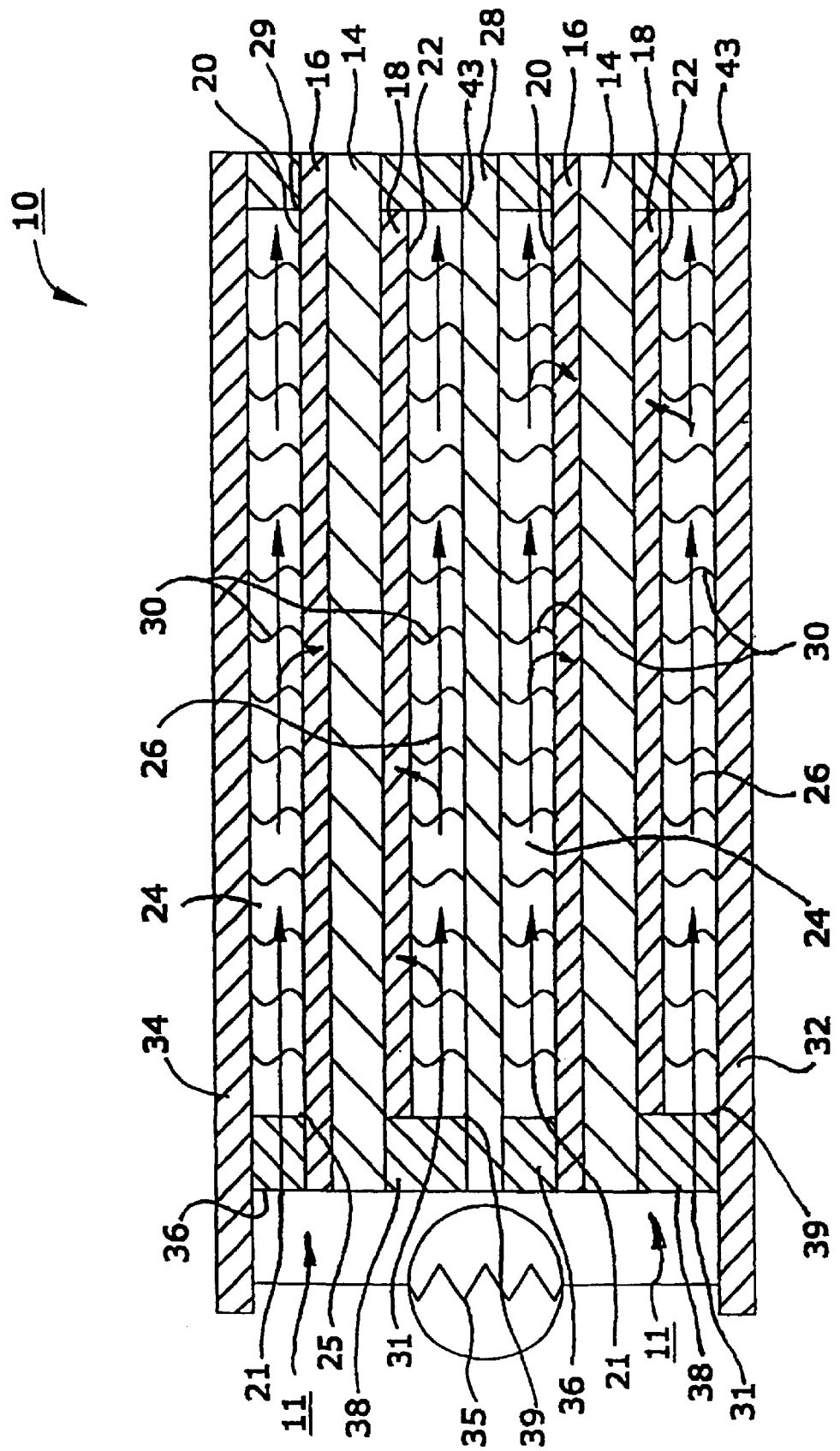
FIG. 1 is a schematic cross-sectional view of a two-cell stack of solid oxide fuel cells.

Referring to FIG. 1, a fuel cell stack 10 includes elements known in the art of solid-oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of one fuel cell 11 faces and is electrically connected to an interconnect 28 by filaments 30 extending across but not blocking passageway 24. Similarly, cathode 18 of fuel cell 11 faces and is electrically connected to interconnect 28 by filaments 30 extending across but not blocking passageway 26. Similarly, cathode 18 of a second fuel cell 11 faces and is electrically connected to a cathodic current collector 32 by filaments 30 extending across but not blocking passageway 26, and anode 16 of fuel cell 11 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way as to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ anions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells 11 are connected in series electrically between the two current collectors, and the total voltage and wattage between the current collectors is the sum of the voltage and wattage of the individual cells in a fuel cell stack.

Figure 2:
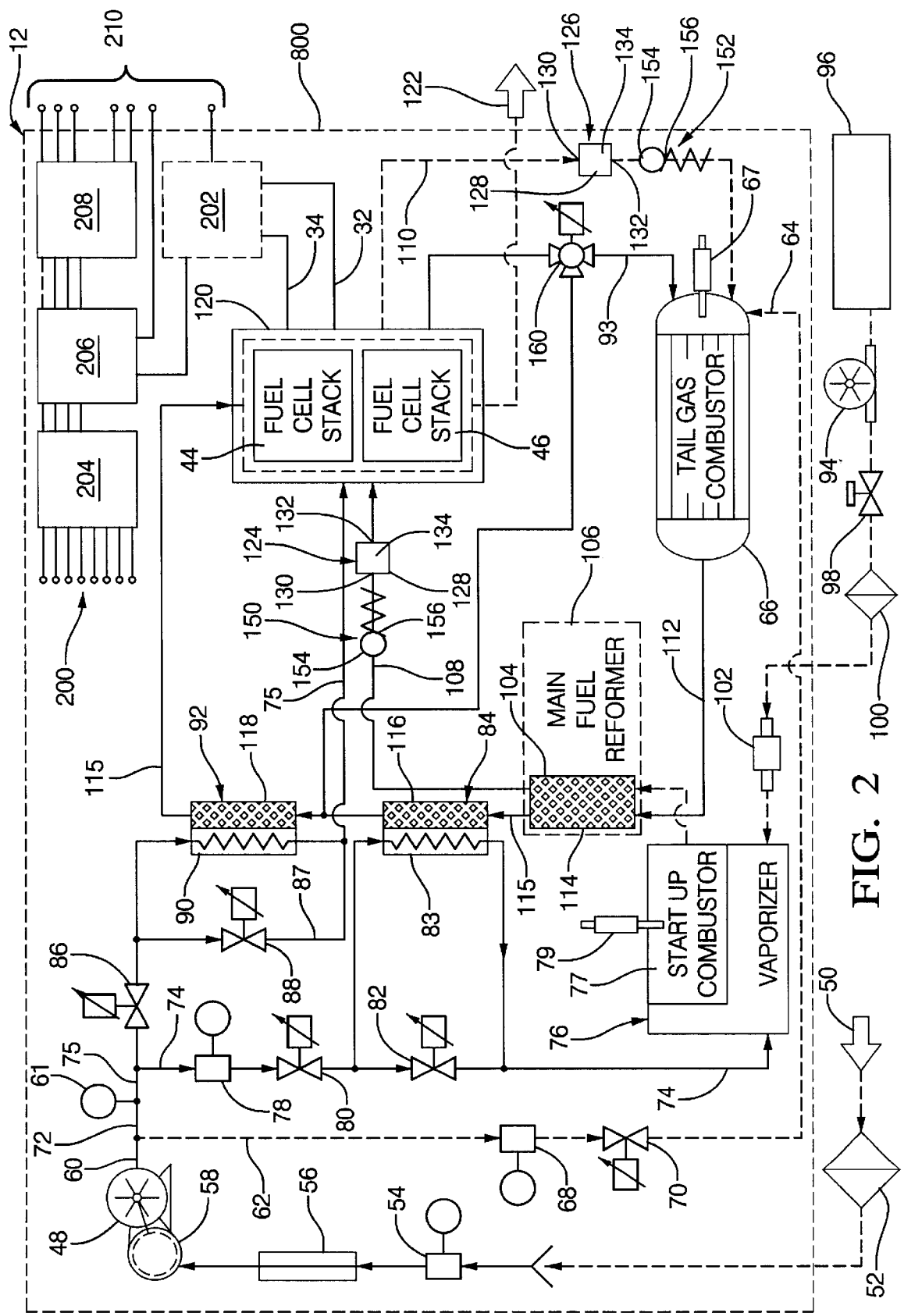
FIG. 2 is a schematic mechanization diagram of an SOFC system in accordance with the invention.
Figure 3:
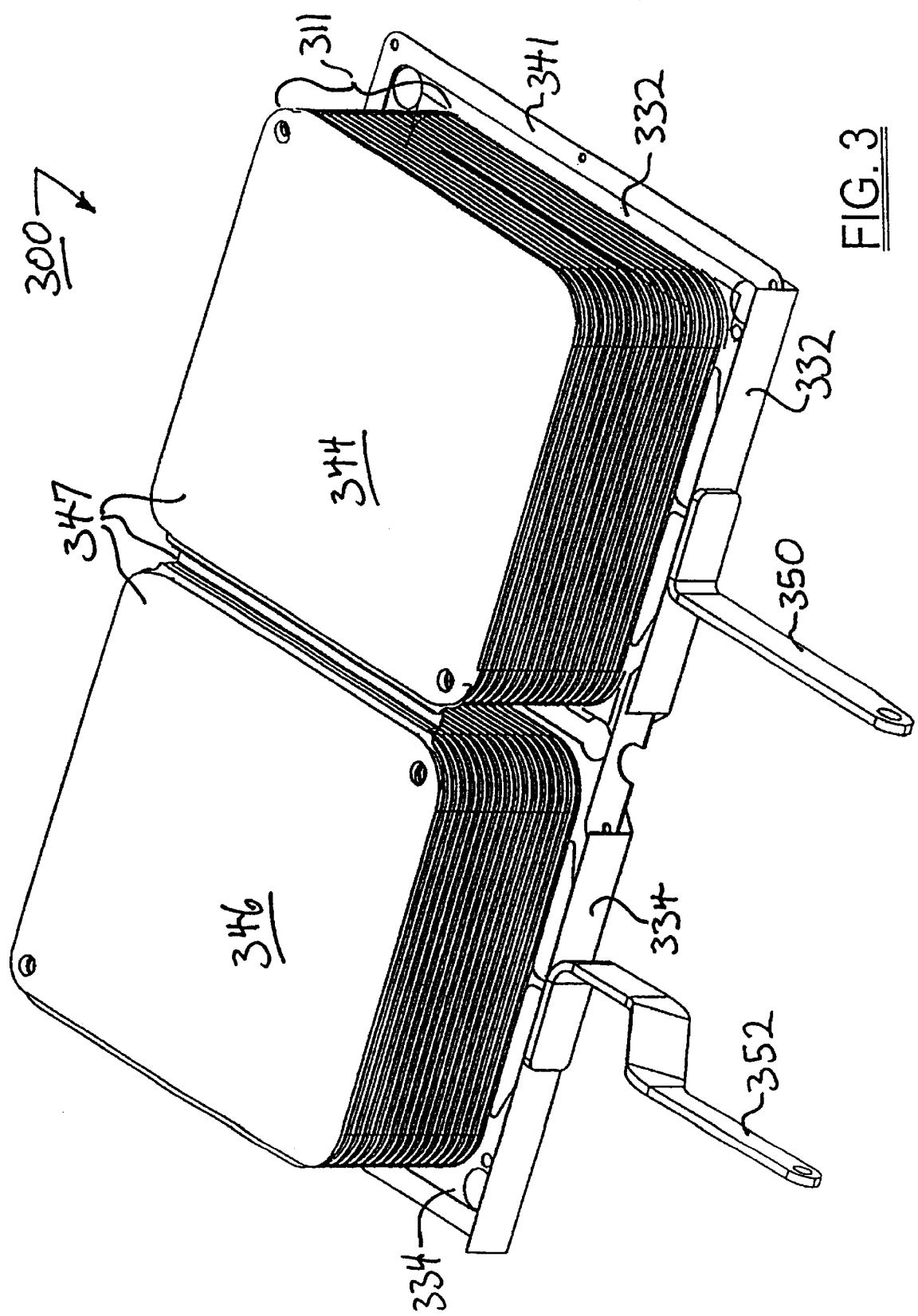
FIG. 3 is an isometric view from above of a two-stack fuel cell assembly, shown connected electrically in series between two current collectors.
Figure 4:
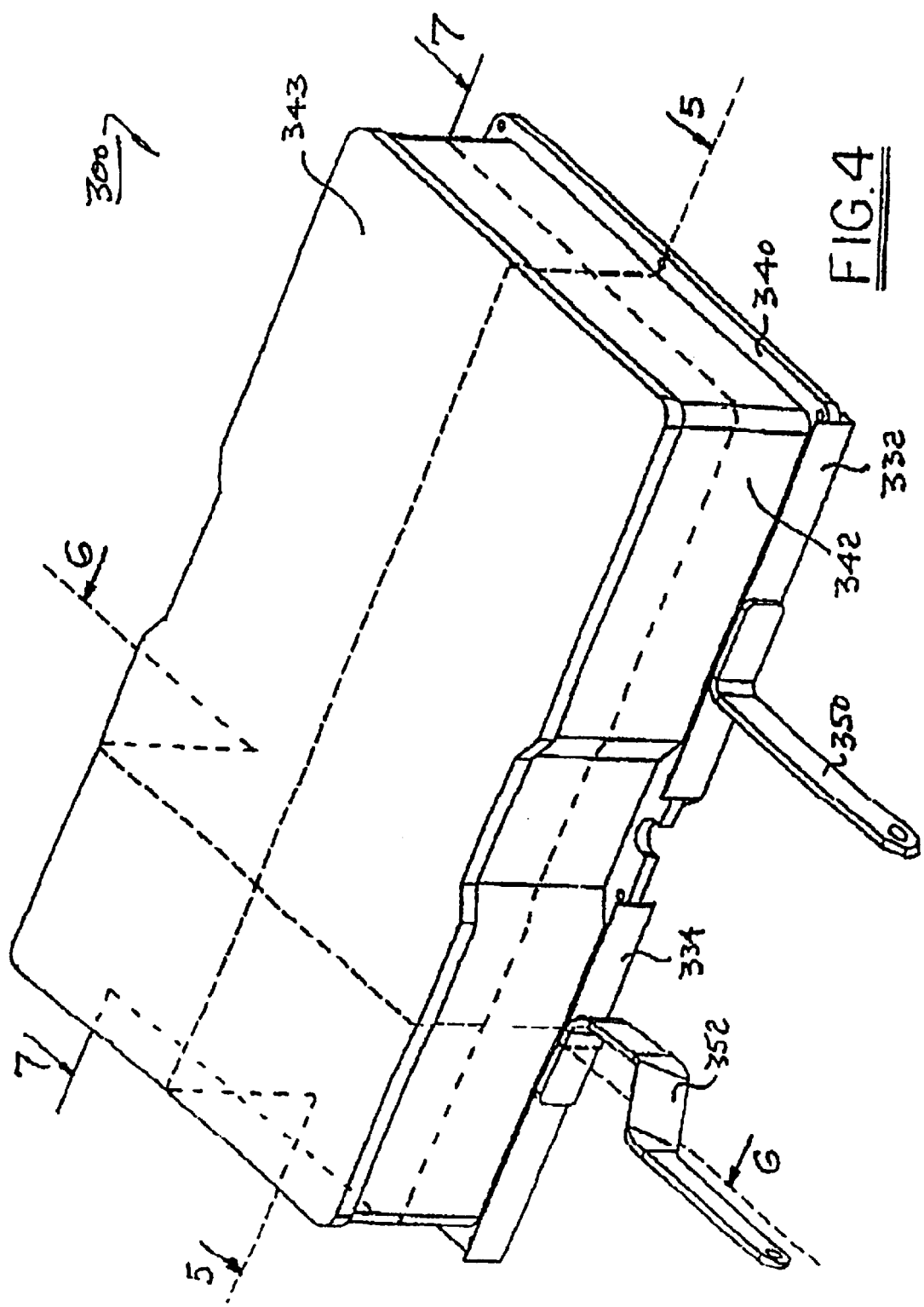
FIG. 4 is an isometric view like that shown in FIG. 3, with a cover enclosing the stacks.
Figure 5:
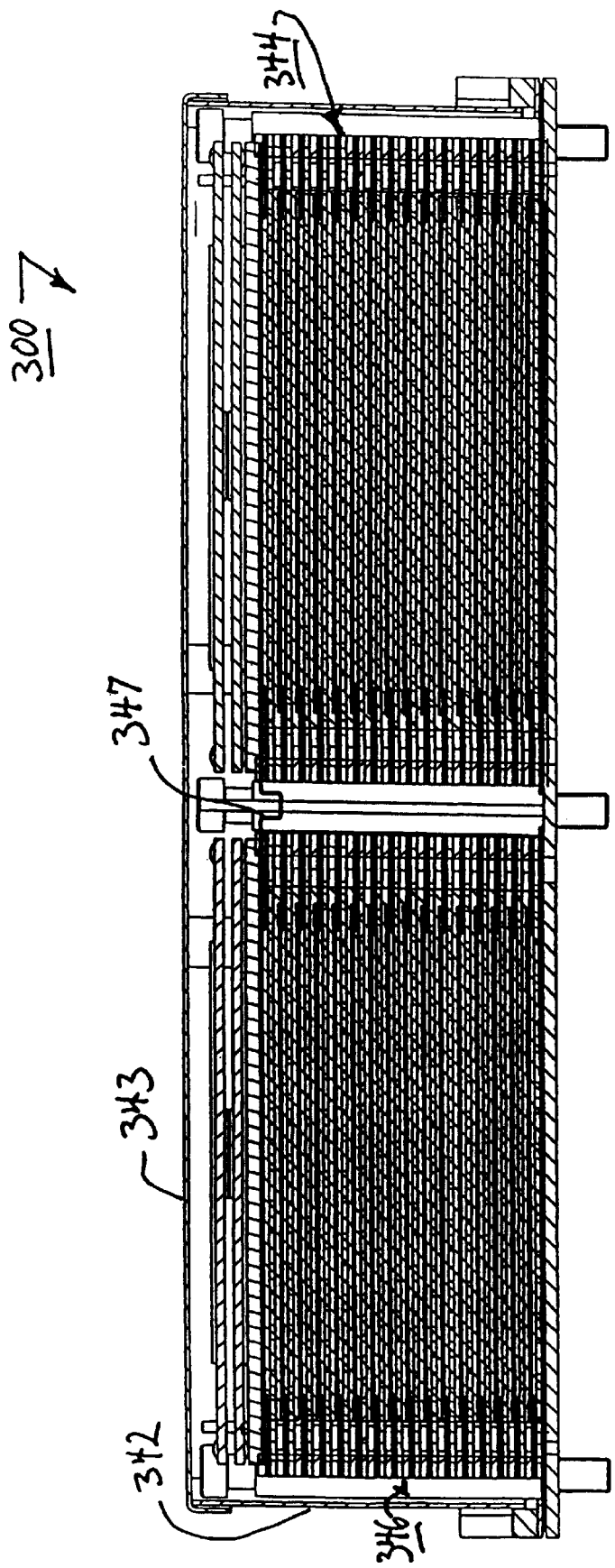
FIG. 5 is an elevational cross-sectional view taken along line 5—5 in FIG. 4.
Figure 6:
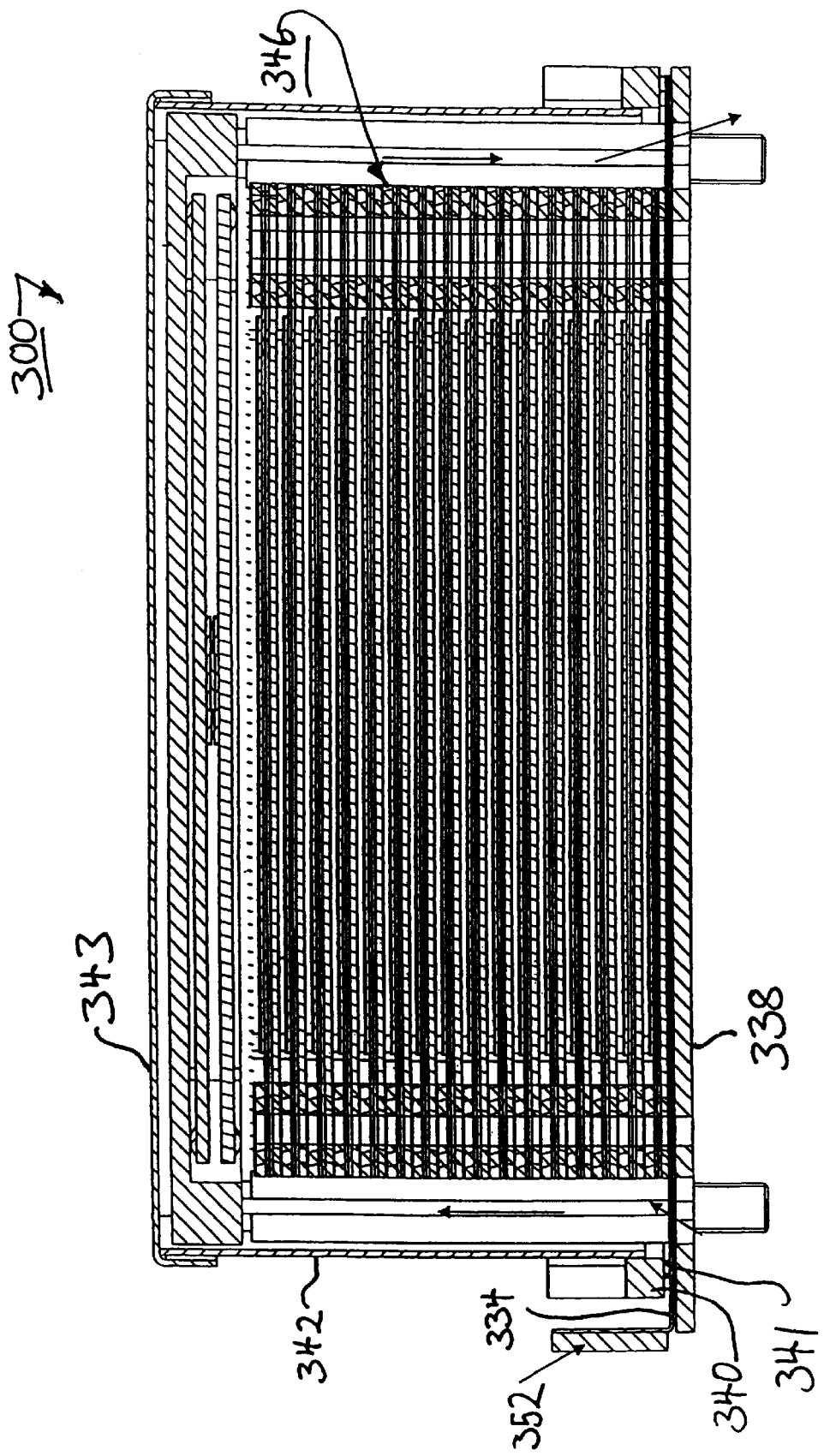
FIG. 6 is an elevational cross-sectional view taken along line 6—6 in FIG. 4.
Figure 7:
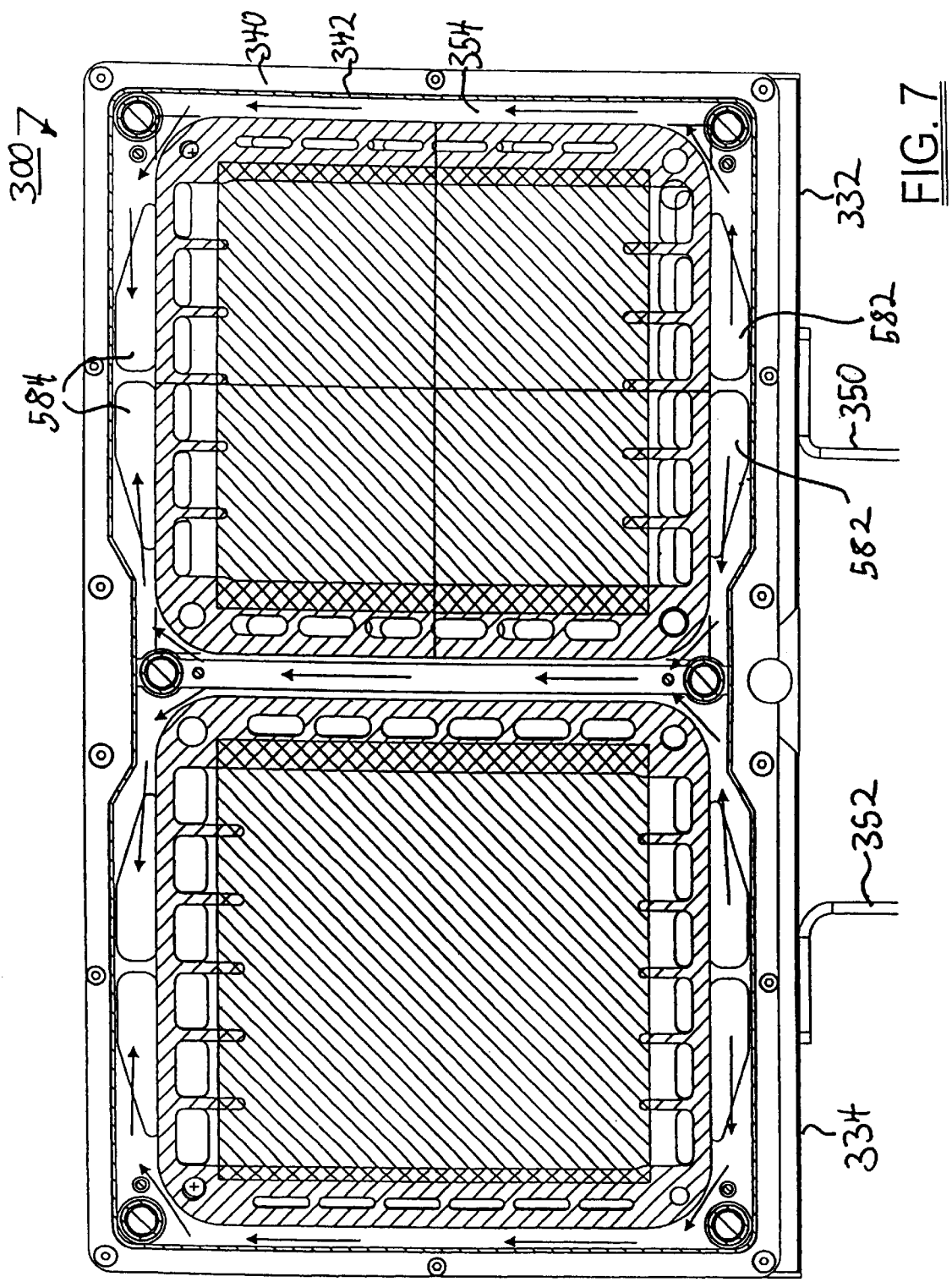
FIG. 7 is an equatorial cross-sectional view taken along line 7—7 in FIG. 4.

Referring to FIG. 2, a schematic mechanization diagram of a solid-oxide fuel cell system 12 in accordance with the invention includes auxiliary equipment and controls.

A conventional high speed inlet air pump 48 draws inlet air 50 through an air filter 52, past a first MAF sensor 54, through a sonic silencer 56, and through a cooling shroud 58 surrounding pump 48. Preferably, an electronics cooling duct 51 (FIG. 10) is also provided in the inlet air feed as a preferred residence for electronic control system 200.

Air output 60 from pump 48, at a pressure sensed by pressure sensor 61, is first split into branched conduits between a feed 62 and a feed 72. Feed 62 goes as burner cooling air 64 to a tail gas afterburner or tail gas combustor 66 having an igniter 67 via a second MAF sensor 68 and a burner cool air control valve 70.

Feed 72 is further split into branched conduits between an anode air feed 74 and a cathode air feed 75. Anode feed 74 goes to a hydrocarbon fuel vaporizer 76 via a third MAF sensor 78 and reformer air control valve 80. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76. Downstream of vaporizer 76 is a start-up combustor 77 having an igniter 79. During start-up, when the reformer is cold or well below operating temperature, vaporized fuel is ignited in combustor 77 and the burned gas is passed directly through the reformer to warm the plates therein more rapidly. Obviously, the start-up combustor is deactivated during normal operation of the system.

Cathode air feed 75 is controlled by cathode air control valve 86 and may be controllably diverted through cathode bypass air feed 87 by cathode air preheat bypass valve 88 through the cool side 90 of cathode air pre-heat heat exchanger 92 on its way to stacks 44,46. After passing through the cathode sides of the cells in stacks 44,46, the partially spent, heated air 93 is fed to afterburner 66.

A hydrocarbon fuel feed pump 94 draws fuel from a storage tank 96 and delivers the fuel via a pressure regulator 98 and filter 100 to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed to the anodes in stacks 44,46. Unconsumed fuel 110 from the anodes is fed to afterburner 66 where it is combined with air supplies 64 and 93 and is burned. When gases are below self ignition temperature, they are ignited by igniter 67. The hot burner gases 112 are passed through a cleanup catalyst 114 in main reformer 106. The effluent 115 from catalyst 114 is passed through the hot sides 116,118 of heat exchangers 84, 92, respectively, to heat the incoming cathode and anode air. The partially-cooled effluent 115 is fed to a manifold 120 surrounding stacks 44,46 from whence it is eventually exhausted 122.

Still referring to FIG. 2, a first check valve 150 and a first oxygen getter device 124 are provided in the conduit feeding reformate 108 to the anodes (not visible) in stacks 44,46. A second check valve 152 and second oxygen getter device 126 are similarly provided in the conduit feeding spent reformate 110 from the anodes to afterburner 66. As described above, during cool-down of the fuel cell stacks after shut-down of the assembly, it is important to prevent migration of oxygen into anode passageways 24 wherein anode surface 20, comprising metallic nickel, would be subject to damaging oxidation. Each check valve includes a typical frusto-conical valve seat 154 receptive of a valve ball 156. Preferably, each valve 150,152 is oriented within SOFC system 12 such that the ball is held in the seat by gravity when reformate is flowed through the system in the forward direction. Thus, fuel flow opens the valve sufficiently for fuel to pass in the forward direction. When SOFC system 12 is shut down, each valve is closed by gravity. The valves may not be identical, as oxygen flows opposite to the reformate in valve 152, but in the same direction as the reformate in valve 150, so the balls and seats may require different weights and/or sizes to function as intended. Each getter 124,126 includes a passageway 128 having an inlet 130 and an outlet 132 through which reformate is passed during operation of the fuel cell assembly. Within the passageway is a readily-oxidized material 134 (oxygen-reducing means), for example, nickel metal foam, nickel wire or nickel mesh, which is capable of gettering oxygen by reaction therewith but which does not present a significant obstruction to flow of reformate through the passageway. Nickel in the getters reacts with oxygen to produce nickel oxide, NiO, when the assembly is shut down, thus protecting the nickel-containing anodes from oxidation. When the assembly is turned back on, reformate is again produced which, in passing through the getters, reduces the NiO back to metallic nickel, allowing the getters to be used repeatedly.

Still referring to FIG. 2, three-way control valve 160 is disposed in line 93 conveying spent cathode air from the stacks 44,46 to combustor 66. To control combustion temperature in combustor 66 by controlling air volume sent thereto, a portion of spent cathode air may be bypassed around the combustor and diverted into the combustor exhaust stream downstream of heat exchanger 84. If the mixture in the combustor is relatively rich in fuel, as may happen during start-up, the combustion temperature can be high enough to generate undesirable oxides of nitrogen and/or damage the combustor components. If the mixture is relatively lean in fuel, the resulting combustion temperature can be too low for supporting an endothermic reforming reaction, or can cause reduced efficiency in the cathode pre-heat heat exchanger 92.

For clarity of presentation and to enhance the reader's understanding, the numbers of elements of the invention as presented further below are grouped in century series depending upon the functional assembly in which the elements occur; therefore, elements recited above and shown in FIGS. 1 and 2 may have different numerical designators when shown and discussed below, e.g., stacks 44,46 become stacks 344,346.

Referring to FIGS. 3 through 7, in a fuel cell stack assembly 300 in accordance with the invention, the cells 311 are arranged side-by-side and may comprise a plurality of cells 311, respectively, such that each of first stack 344 and second stack 346 is a stack of identical fuel cells 311. The plurality of cells is preferably about 30 in each of the two stacks. The cells 311 in stack 344 and stack 346 are connected electrically in series by interconnect 347, and the stacks are connected in series with cathode current collector 332 and anode current collector 334 on the bottom of the stacks. The current collectors are sized to have a "footprint" very close to the same dimension as a cover-sealing flange 340. The current collectors preferably are adhesively sealed to a stack mounting plate 338, and the stacks preferably are in turn adhesively sealed to the current collectors. The sealing flange 340 for the cover 342 and top 343 is then mounted and sealed to the current collector plates. A gasket 341 between flange 340 and the current collectors is a dielectric so that flange 340 does not cause a short between the current collectors. Power leads 350,352 are attached to current collectors 332,334, respectively, through strong, reliable and highly conductive metallurgical bonds, such as brazing. In this manner, the current collectors may pass under the cover sealing flange 340, with no additional sealing or power lead attachment required, and do not have to pass undesirably through the cover itself, as in some prior art stack assemblies. Passing leads through the cover makes the assembly more complex and less reliable.

Figure 8:
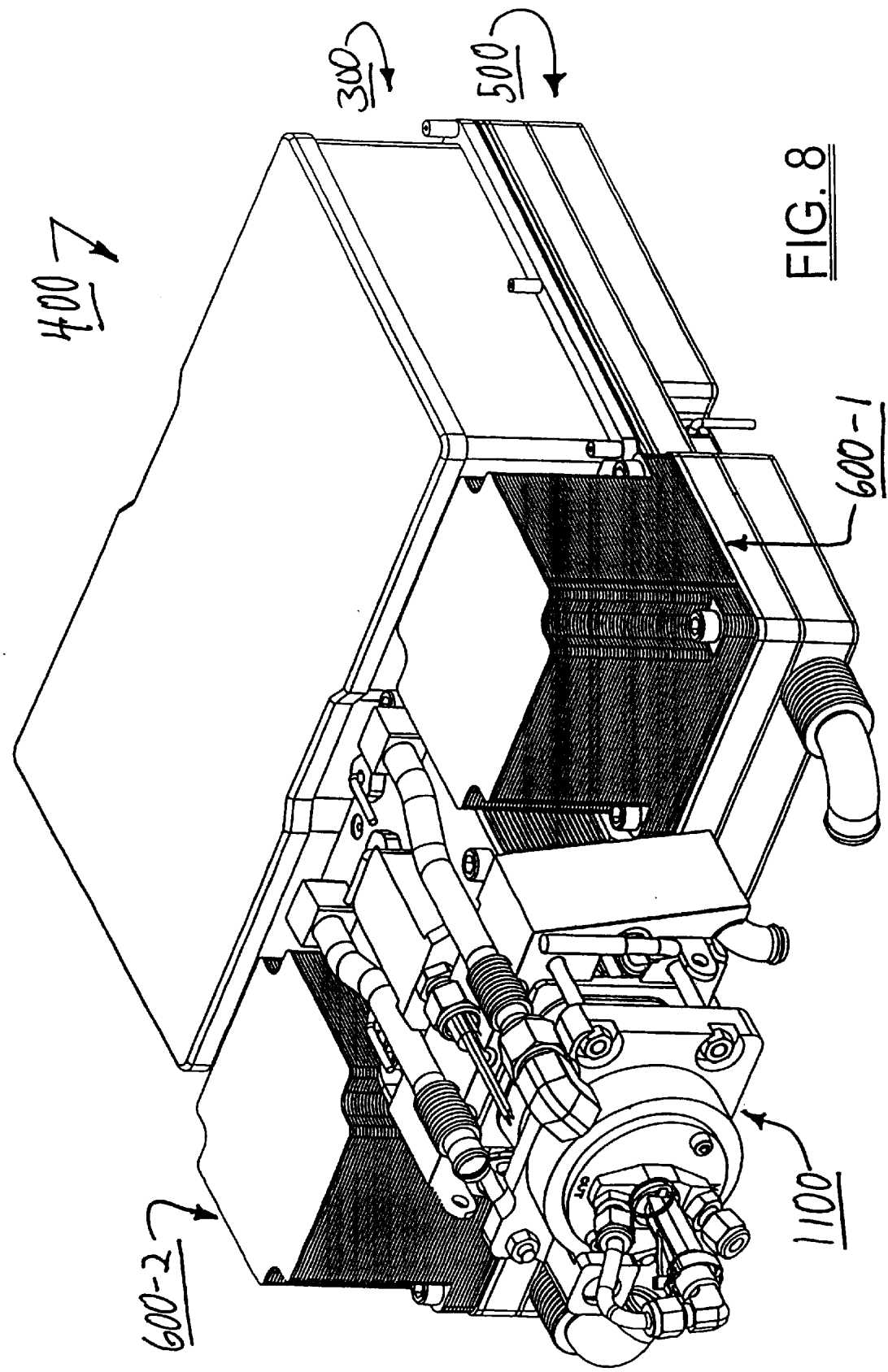
FIG. 8 is an isometric view from above, showing a fuel cell assembly comprising the apparatus of FIG. 4 mounted on a manifold in accordance with the invention, along with reforming, combusting, and heat exchanging apparatus for servicing the fuel cell stacks.

Referring to FIG. 8, a fuel cell assembly 400 in accordance with the invention comprises stack assembly 300 operatively mounted on an integrated fuel/air manifold assembly 500 which also supports first and second cathode air heat exchangers 600 and an integrated fuel reformer and waste energy recovery unit ("reforWER") 1100. Assembly 400 receives air from air supply system 900 (FIGS. 10–12) as described below and selectively preheats air going to the reformer. ReforWER 1100 reforms hydrocarbon fuel, such as gasoline, into reformate fuel gas comprising mostly hydrogen, carbon monoxide, and lower-molecular weight hydrocarbons, tempers the air and reformate entering the stacks, selectively burns fuel not consumed in the stacks, recovers heat energy generated in various internal processes which would otherwise be wasted, and exhausts spent air and water, all in order to efficiently generate DC electric potential across power leads 350,352 (not visible in FIG. 8). The structure and internal functioning of reforWER 1100 is discussed in detail hereinbelow.

Figure 9:
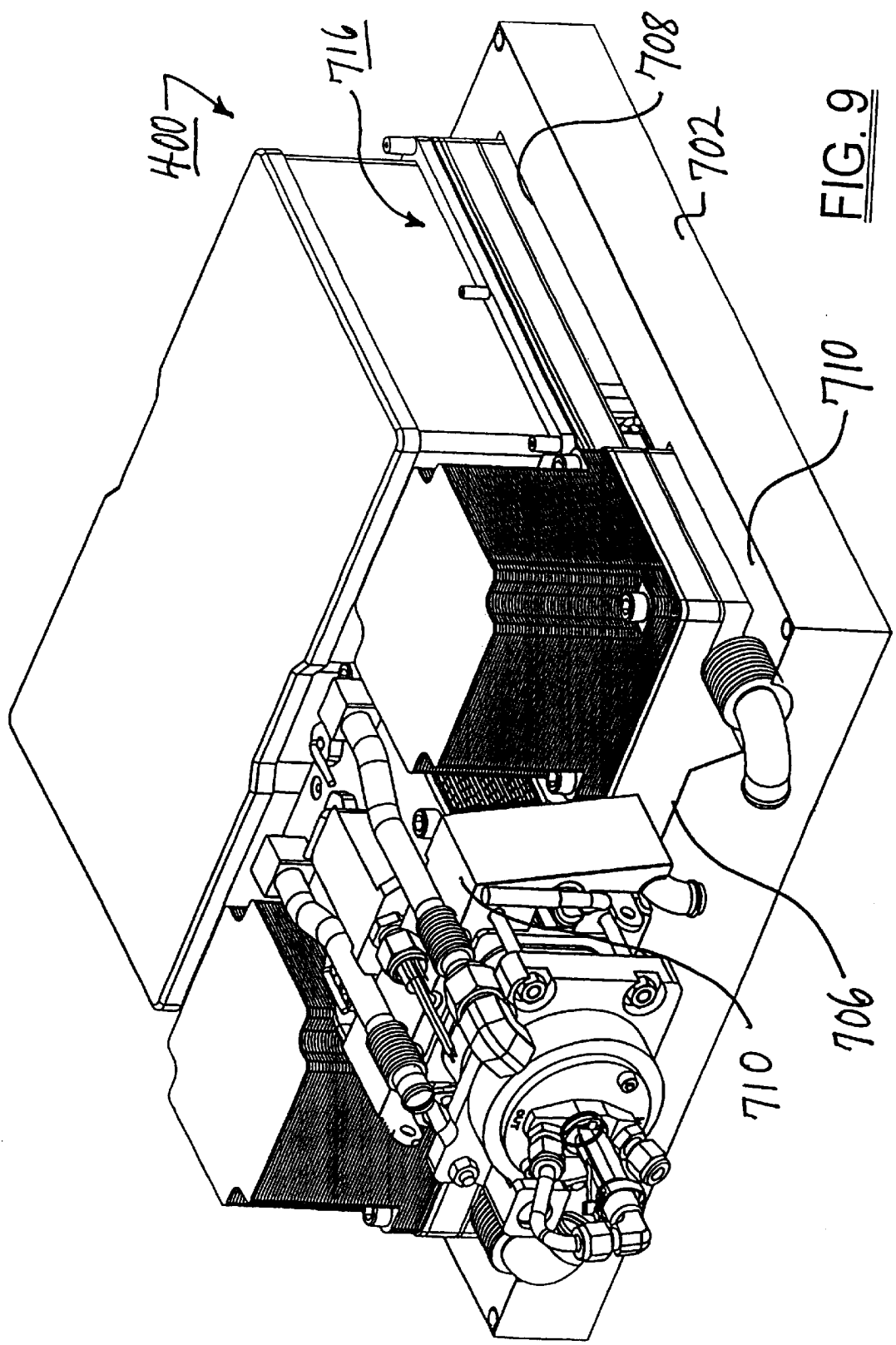
FIG. 9 is an isometric view from above, showing the fuel cell assembly of FIG. 8 mounted in the lower element of a thermal enclosure.
Figure 10:
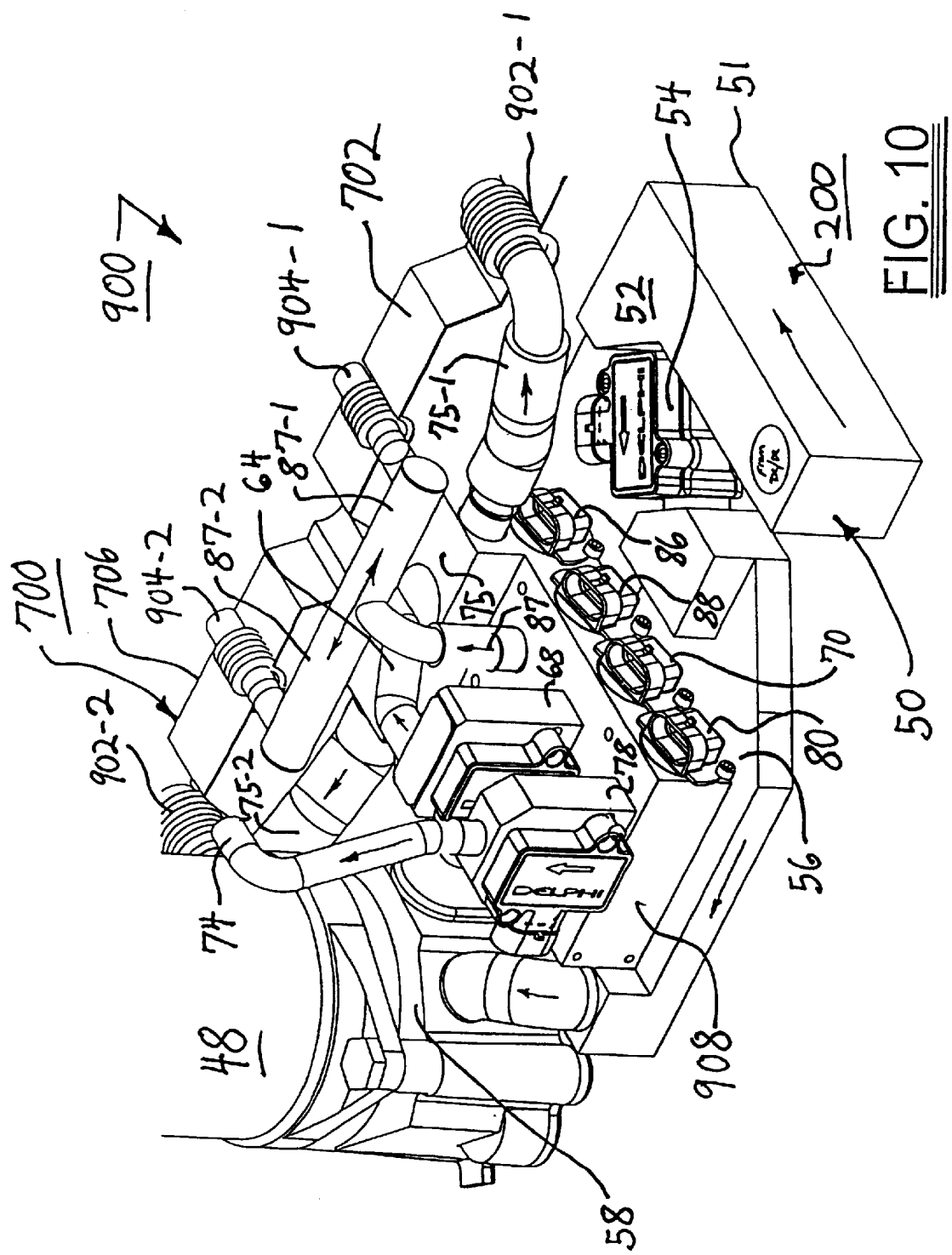
FIG. 10 is an isometric view from above of an integrated air supply system for controllably providing air to the fuel cell assembly shown in FIGS. 8 and 9.
Figure 11:
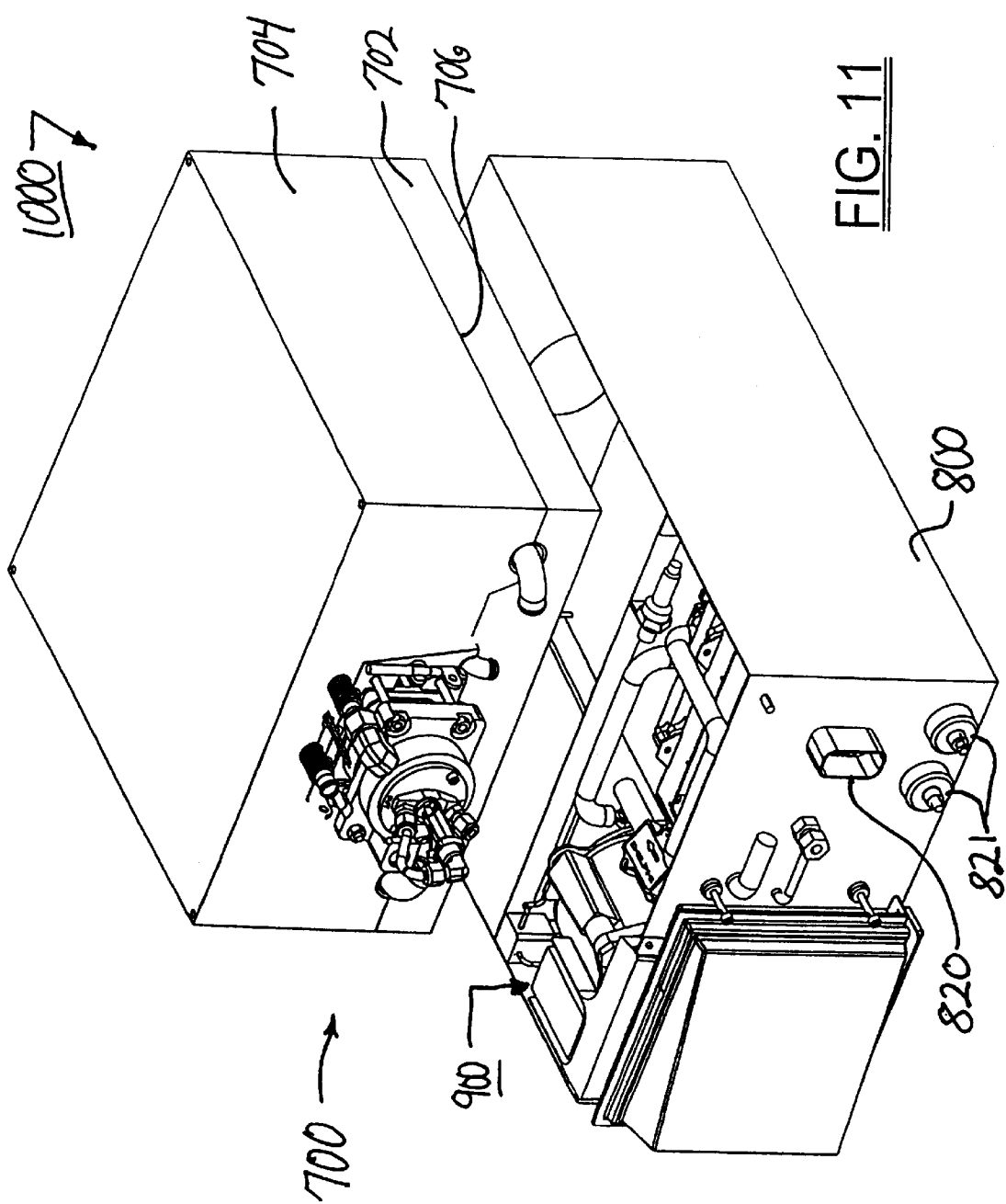
FIG. 11 is an exploded isometric view of a fuel cell system in accordance with the invention, showing the air supply system of FIG. 10 disposed in a structural enclosure, and showing the fuel cell assembly of FIG. 9 fully enclosed by both upper and lower elements of a thermal enclosure.

Referring to FIGS. 9 through 11, there are two basic functions for the enclosure of a fuel cell system. The first is to provide thermal insulation for the components which function at an elevated temperature (700–900° C.) to maintain them at that temperature for efficient operation, to protect lower temperature components, and to reduce the exterior temperature over the overall unit to a human-safe level. The second is to provide structural support for mounting of individual components, mounting the system to another structure such as a vehicle, protection of the internal components from the exterior environment, and protection of the surrounding environment from the high temperatures of the fuel cell assembly. Prior art systems utilize a single enclosure to provide all functions, which can be complex and costly to fabricate and assemble, and consumptive of space.

Still referring to FIGS. 9 through 11, in the present invention, enclosure of the fuel cell assembly comprises two nested enclosures: a thermal enclosure 700 and a structural enclosure 800. Fuel cell assembly 400 is first disposed in a "clam-shell" type thermal enclosure 700, comprising a bottom portion 702 and a top portion 704, which in turn is disposed in a structural enclosure 800. The split line 706 between bottom portion 702 and top portion 704 is easily arranged such that all pipes, manifolds, shafts, power leads, etc., which need to pass between the "hot zone" 716 within the thermal enclosure and the "cool zone" 816 within the structural enclosure, do so in the middle of split line 706. This provides for easy assembly of the hot components into the thermal enclosure. Preferably, flexible bellows isolator couplings 902-1,902-2,904-1,904-2,912 in air tubes connecting the air supply system to the manifold system and disposed specifically within the wall of the thermal enclosure, as shown in FIG. 10, to further minimize heat transfer out of the hot zone.

First, all hot zone components, included in assembly 400, are nestled into in bottom portion 702, which may be provided with a conforming well 708 for securely holding and cushioning assembly 400, as shown in FIG. 9. The mating surface 710 of bottom portion 702, along split line 706, is configured as required to accommodate the lower halves of the components extending through enclosure 700. Top portion 704 is configured to matingly engage bottom portion 702. Top portion 704 is placed onto bottom portion 702 and may be sealed thereto along line 706 as desired. Thermal enclosure 700 may be formed of any suitable high-temperature high-efficiency insulating material, as is known in the insulating art, and may be a composite including a light-weight metal case. The range of suitable insulating materials is expanded by removing the constraint of overall structural integrity afforded by providing a separate structural enclosure 800.

Structural enclosure 800 preferably is fabricated from thicker metal, for example, to provide structural strength and a simple shape, such as a box with a removable lid, for ease of fabrication. Features such as brackets, studs, electrical connectors, studs, weld-nuts, air intake ducts, and exhaust ducts, for example, may be part of the structural enclosure for mounting internal components thereto and for connecting the system to external structures. Features for vibration and shock isolation (not shown) may also be provided with the enclosure.

Figure 12:
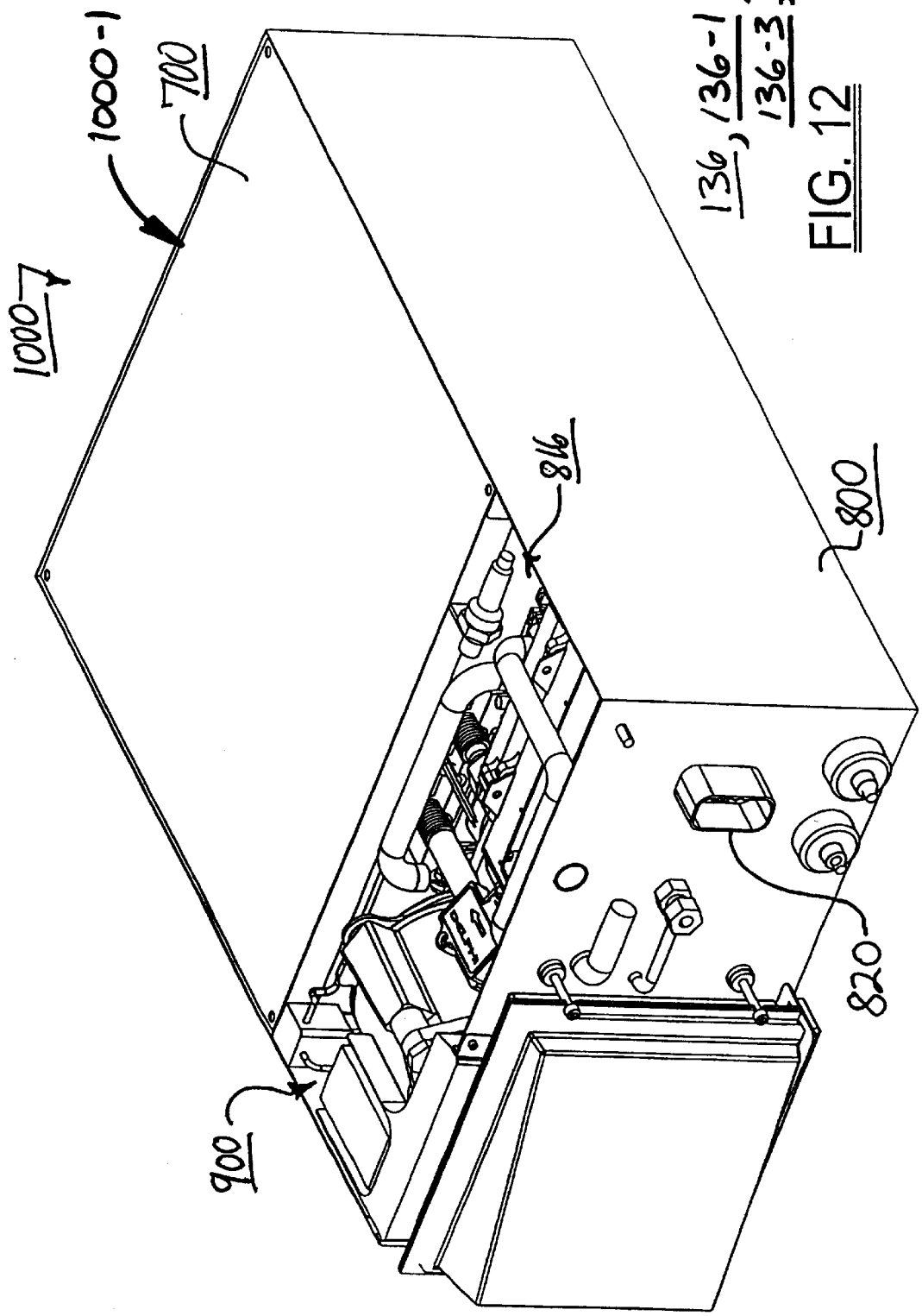
FIG. 12 is an isometric view from above of a fully assembled fuel cell system in accordance with the invention.
Figure 23:
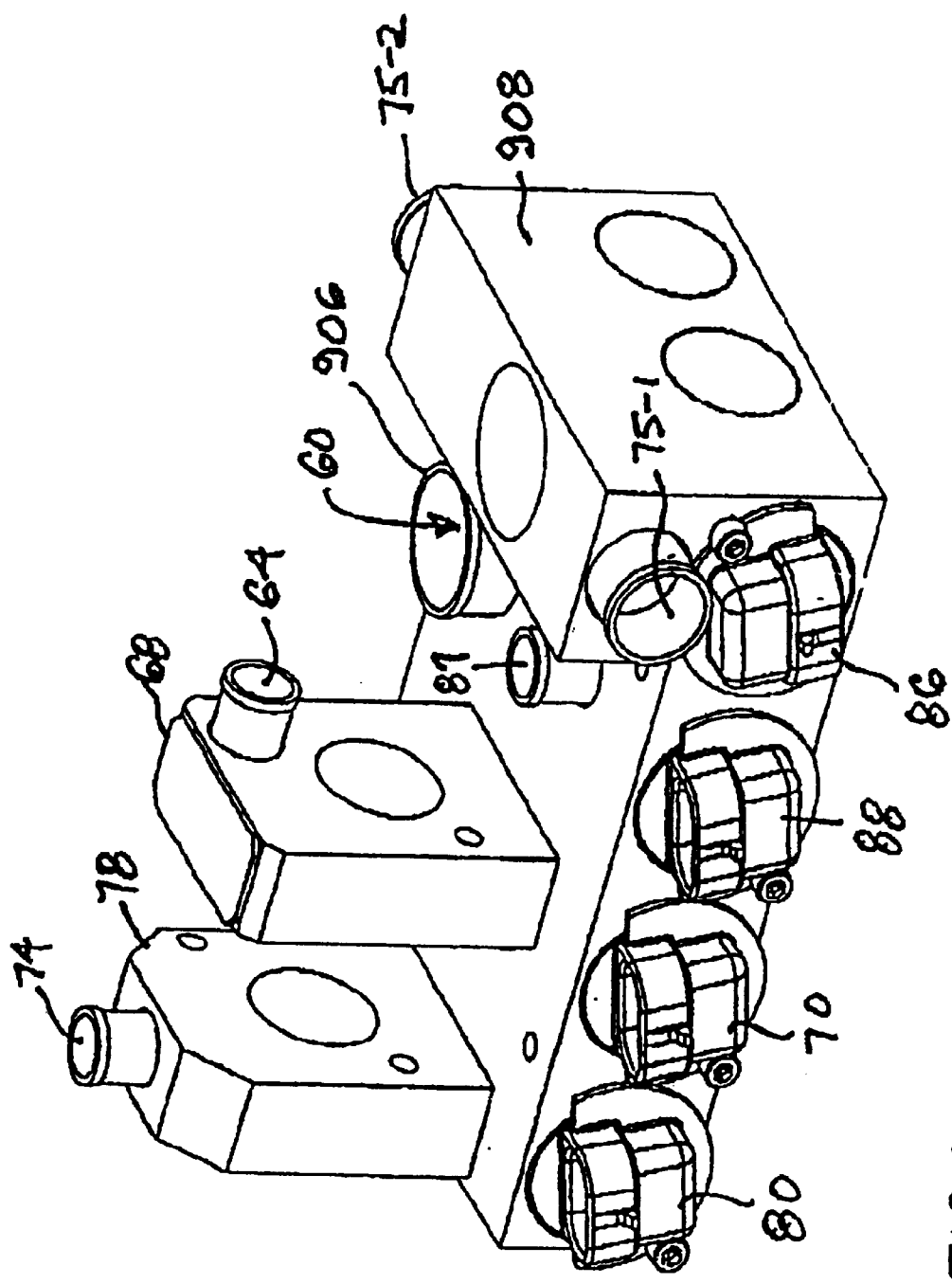
FIG. 23 is a detailed isometric view from above of an air distribution manifold assembly shown in FIG. 10.
Figure 24:
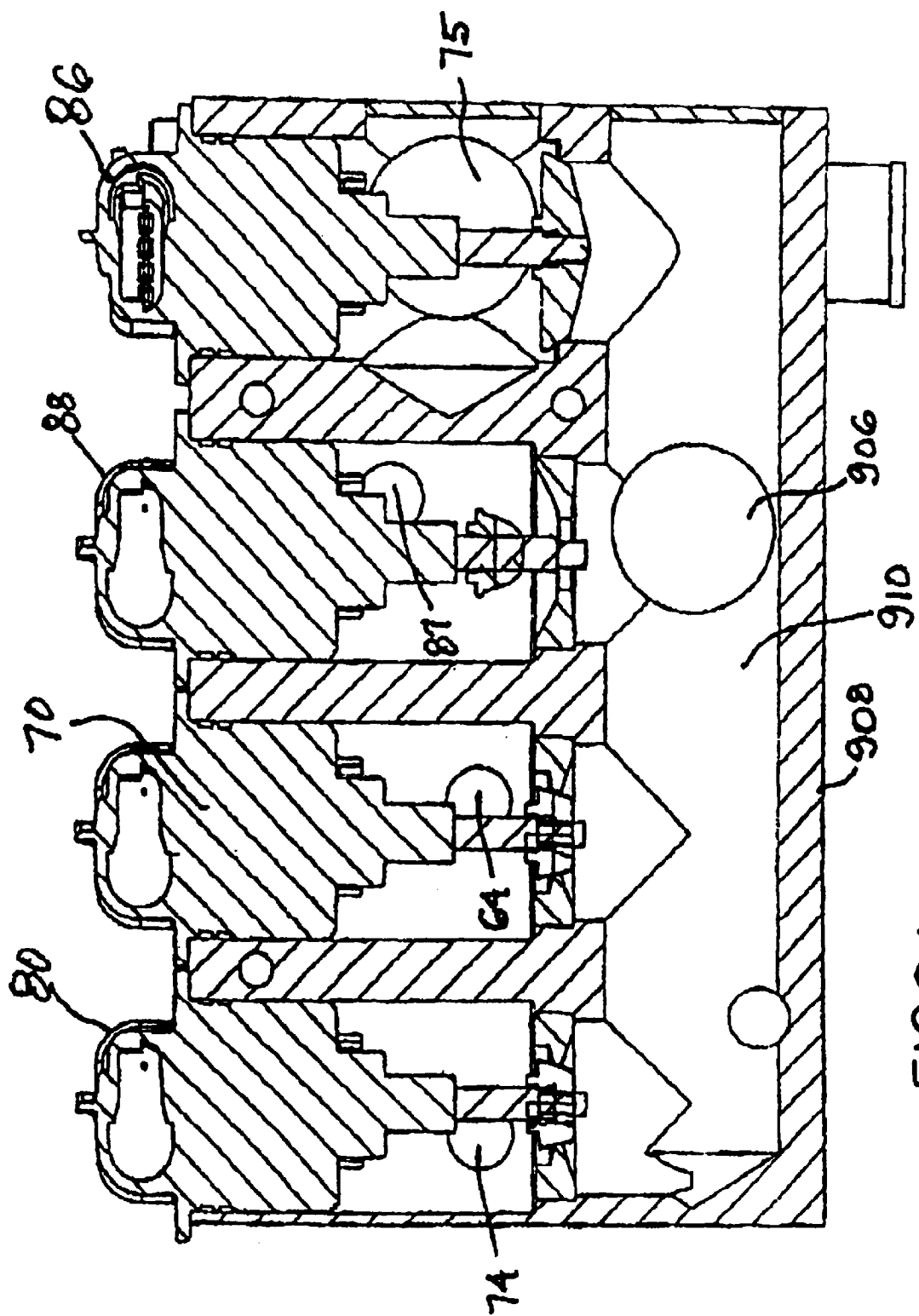
FIG. 24 is a horizontal cross-sectional view through the manifold shown in FIG. 23.

The air control assembly 900 is connected to elements of fuel cell assembly 400 projecting through split line 706; and assemblies 700,900 are then installed within structural enclosure 800, as shown in FIG. 12, to form a fuel cell system 1000 in accordance with the invention. Preferably, control system 200 (shown schematically in FIG. 2 as power conditioner 202, circuit protection I/O 204, drivers 206, and electronic control unit 208, but not visible in FIG. 12) is also installed onboard the system within cool zone 816 to minimize the number of discrete signals 210 which must be passed through enclosure 800 via connector 820. Note also that high current capacity power leads also pass through enclosure 800 via dual connectors 821. Preferably, control system 200 is mounted in either an air inlet duct 51 supplying air pump 48 or in active air flow space (not shown) in air distribution manifold block 908 (FIGS. 23–24), for maximum cooling of electronic components as well as beneficial pre-heating of the incoming air.

Figure 13:
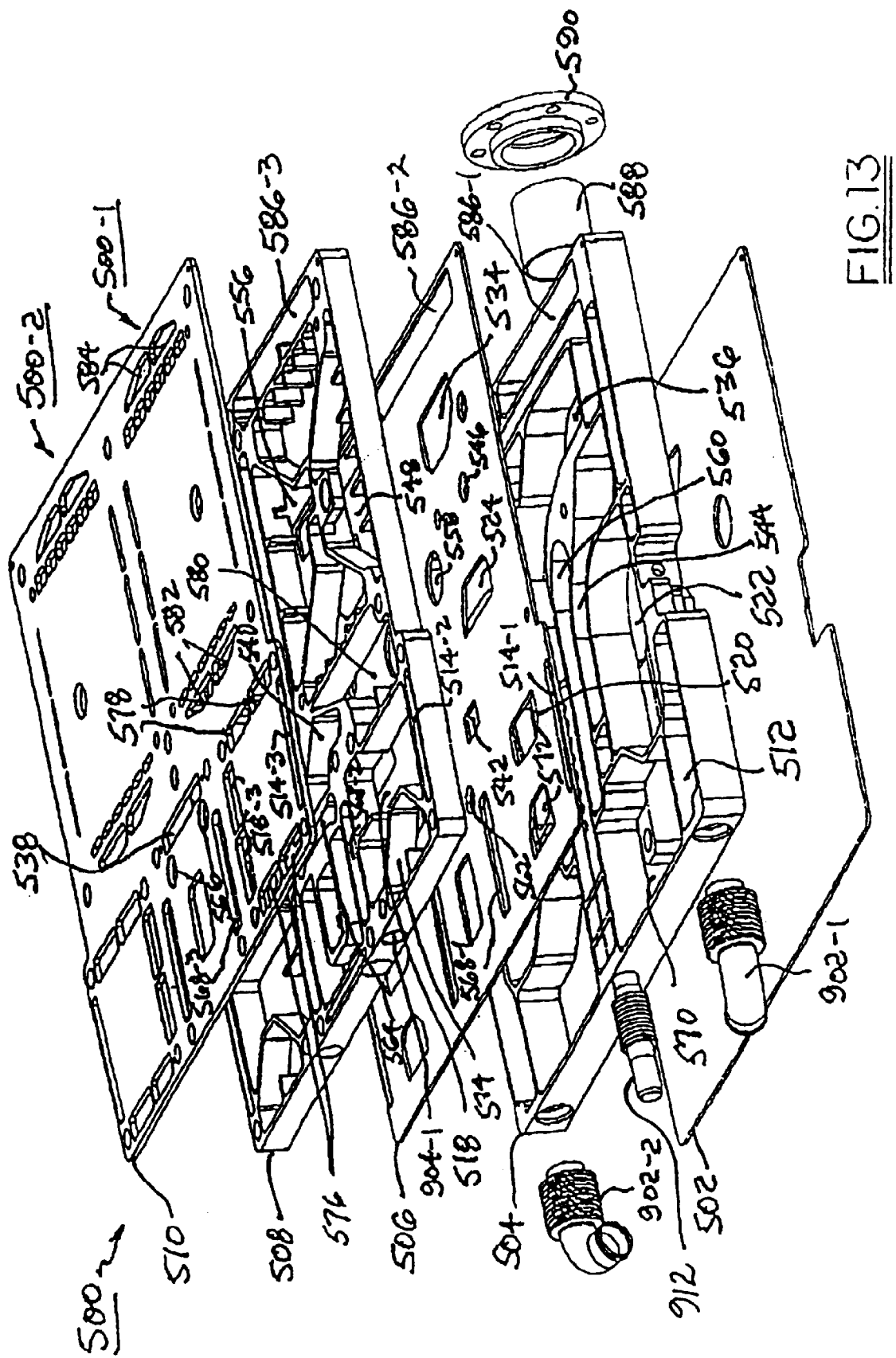
FIG. 13 is an exploded isometric view from the front, showing a multi-element basal manifold in accordance with the invention for distributing air and reformate fuel and exhaust products through and around the fuel cell stacks, as shown in FIG. 8.
Figure 14:
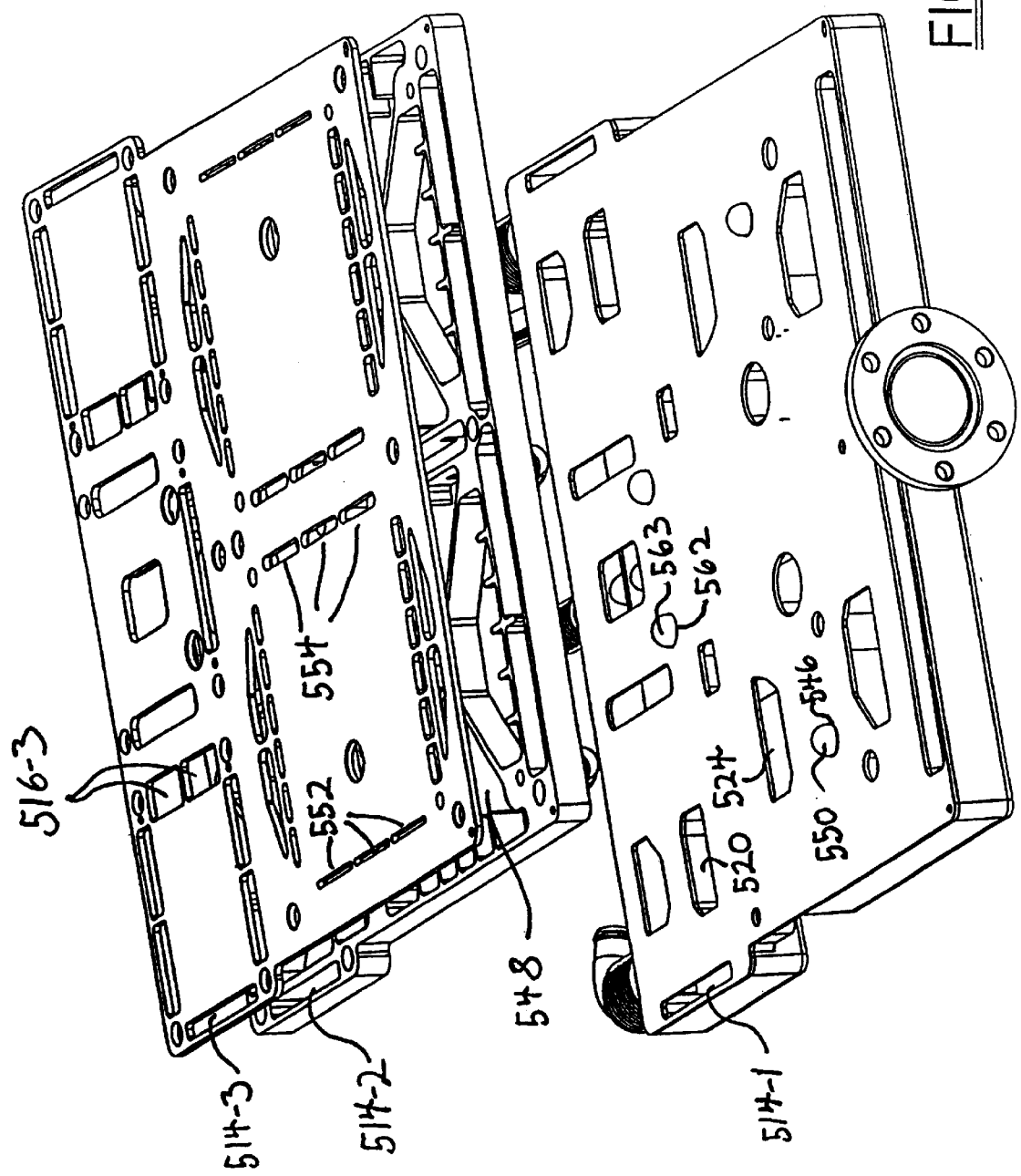
FIG. 14 is an isometric view from the rear, showing the manifold of FIG. 13 partially assembled.
Figure 15:
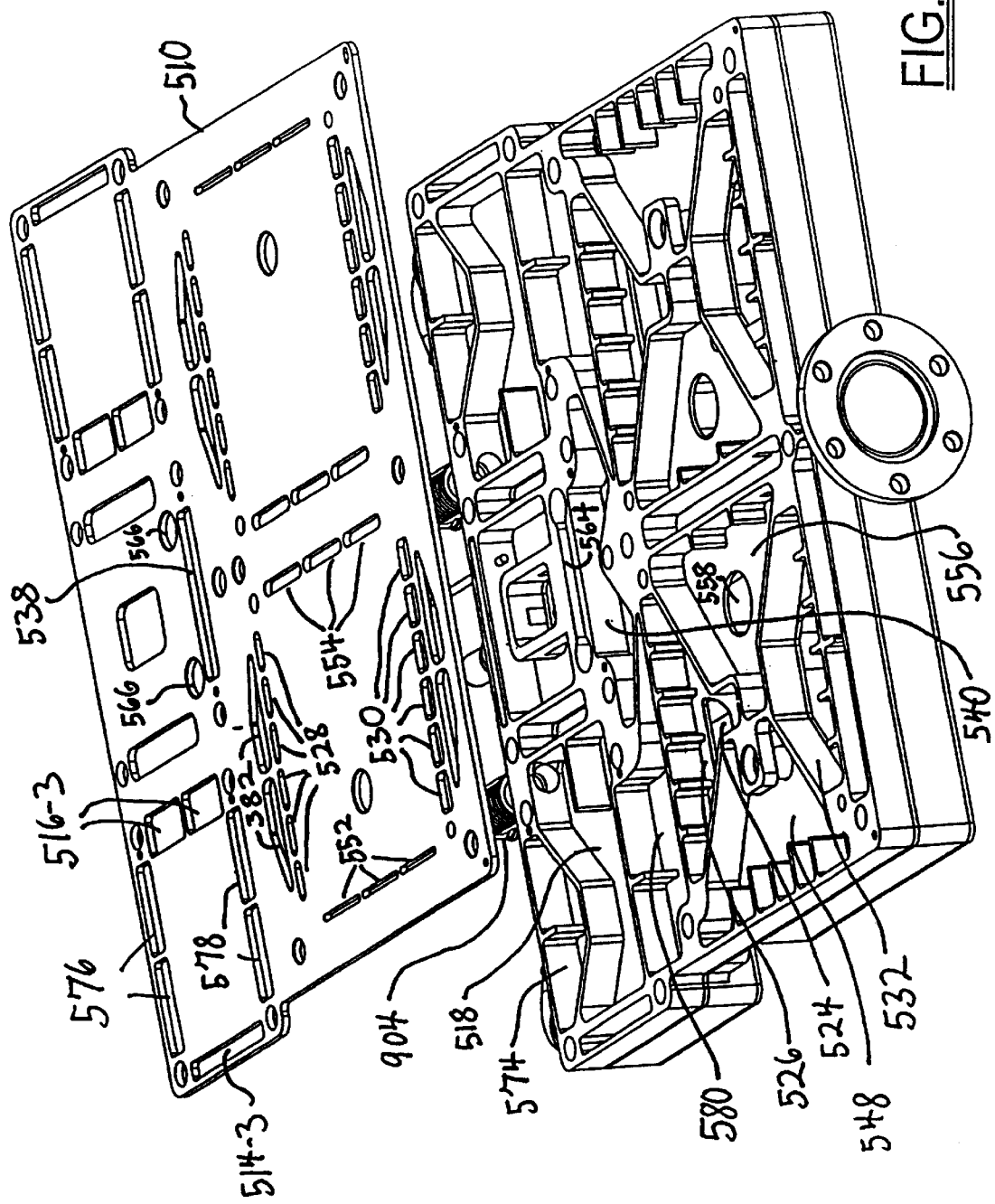
FIG. 15 is an isometric view from the rear, showing the manifold of FIG. 13 further assembled.

Referring to FIGS. 13 through 18, an integrated fuel/air manifold assembly 500 receives air via flexible bellows elements from air supply system 900 and reformed fuel from reforWER 1100 and conveys high temperature air, exhaust, and hydrogen-rich reformate fuel to and from the core components of the system. Basal manifold assembly 500 is shown in FIG. 13 as comprising a three-dimensional assembly of three perforated plates and two partitioned elements which are easily and inexpensively formed and which comprise a two-level network of passageways which allow for the mounting, close-coupling, and integration of critical fuel cell system components, including heat exchangers, combustors, fuel reformers, solid-oxide fuel cell stacks, check valves, threaded inserts, and catalyzed and non-catalyzed filters. Of course, while a five-component manifold is shown for simplicity, within the scope of the invention any two of the perforated plates obviously may be incorporated into the partitioned elements, through appropriate and obvious casting or moulding processes, such that the manifold comprises only three elements.

It should be noted that manifold 500 is actually two mirror image manifolds 500-1,500-2 sharing some common features, for example, cathode air return from the stacks. Thus, reformate fuel flows from reforWER 1100 in two parallel streams to stacks 344 and 346 and is returned to reforWER 1100 in two parallel streams. Likewise, cathode air flow from air supply system 900 is divided into two parallel streams and enters into each manifold 500-1,500-2 via mirror image bellows insulator couplings 902-1 and 902-2 (FIGS. 8–10 and 13). Fuel cell assembly 400 thus is seen to have its fuel cell stacks 344,346 connected in series electrically but serviced by gas flows in parallel.

For simplicity of presentation and discussion, except where functions are unique, the following construction and function is directed to manifold 500-1 but should be understood to be equally applicable to mirror-image manifold 500-2.

Figure 16:
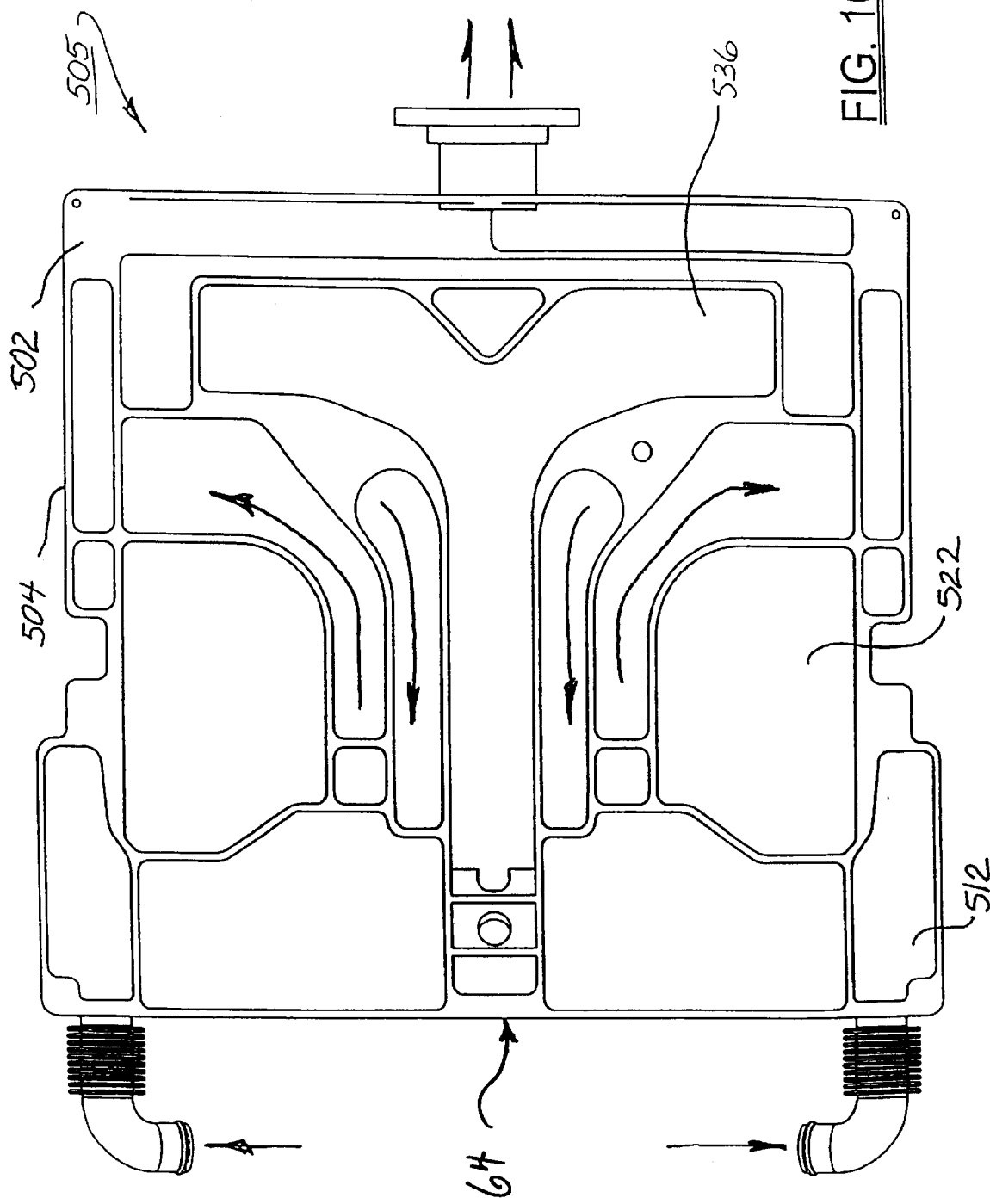
FIG. 16 is a plan view of the lower level of chambers formed by the lower two elements shown in FIG. 13.
Figure 17:
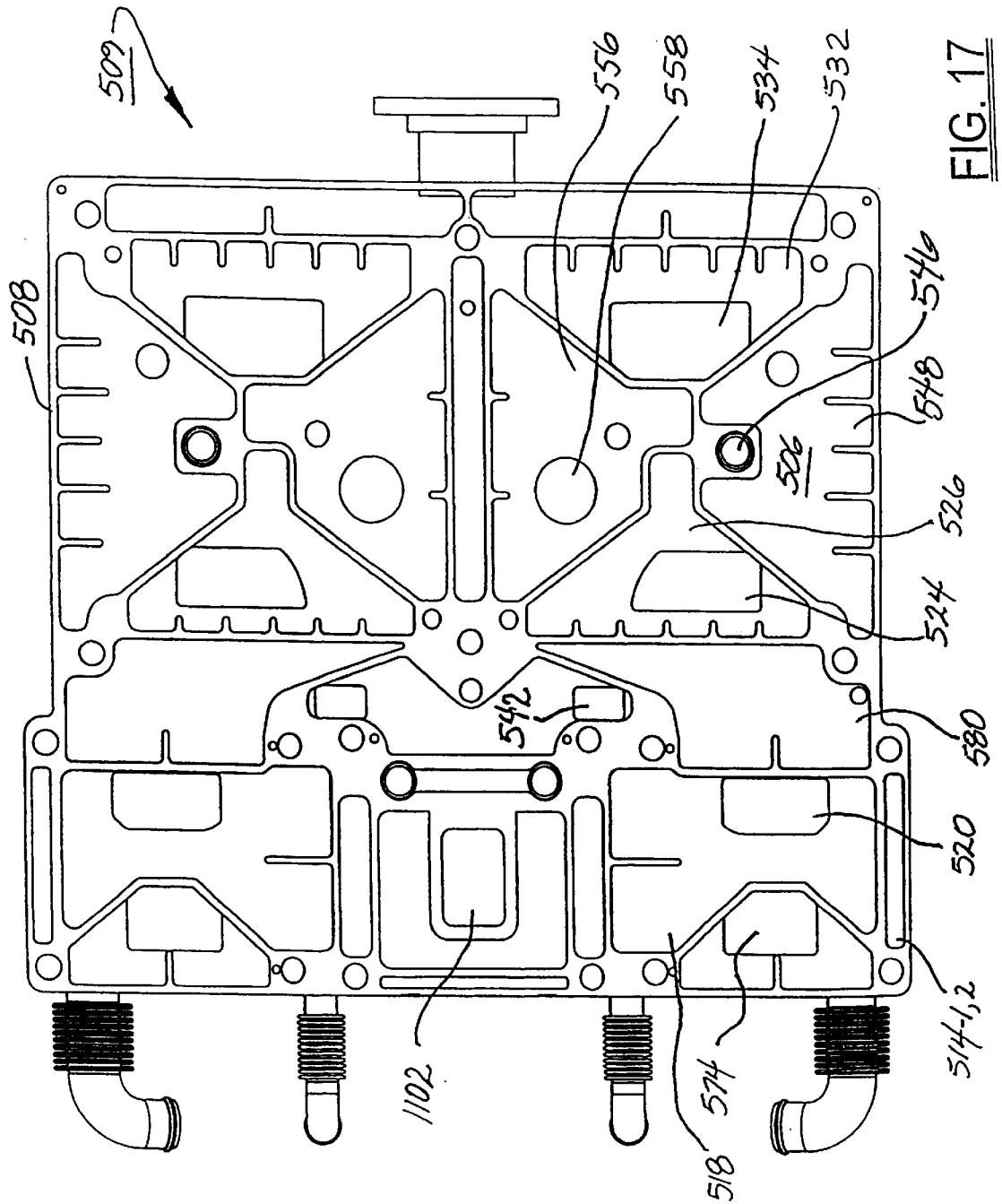
FIG. 17 is a plan view of the upper level of chambers formed by the third and fourth elements shown in FIG. 13.
Figure 18:
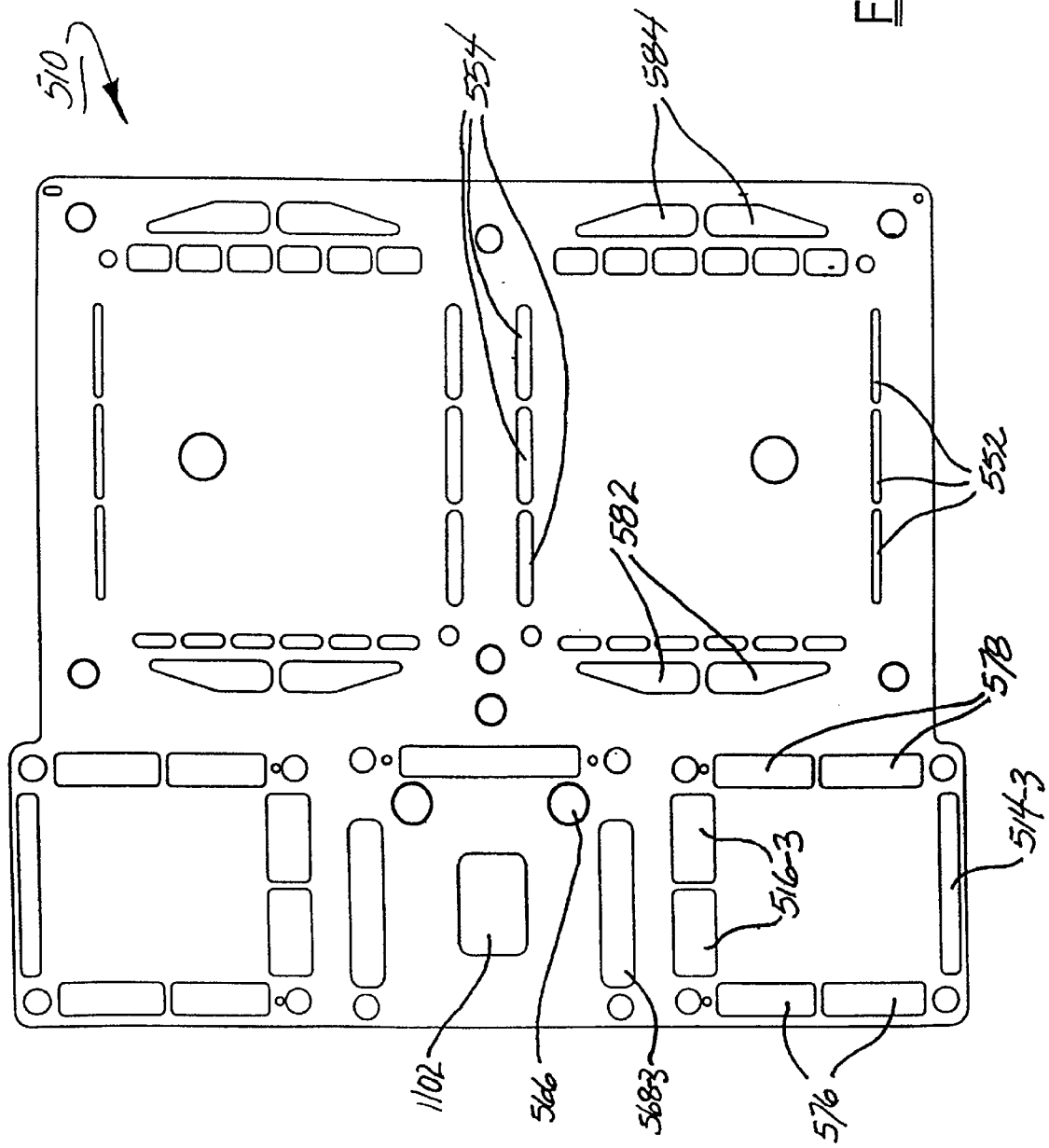
FIG. 18 is a plan view of the uppermost element shown in FIG. 13, showing the mounting surface for the apparatus shown in FIG. 8.
Figure 19:
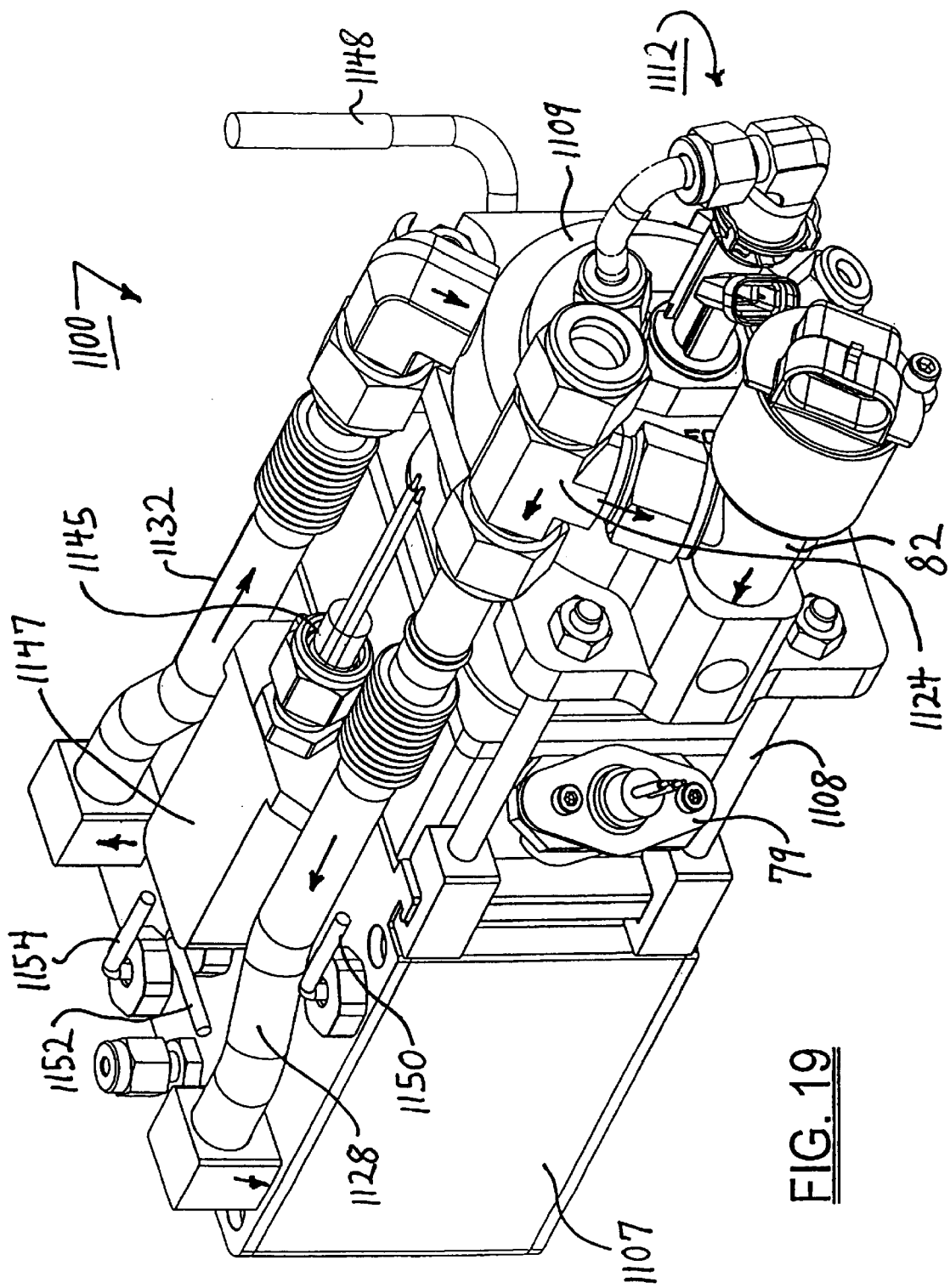
FIG. 19 is an isometric view from above of a fuel reformer and waste energy recovery (reforWER) system in accordance with the invention.
Figure 20:
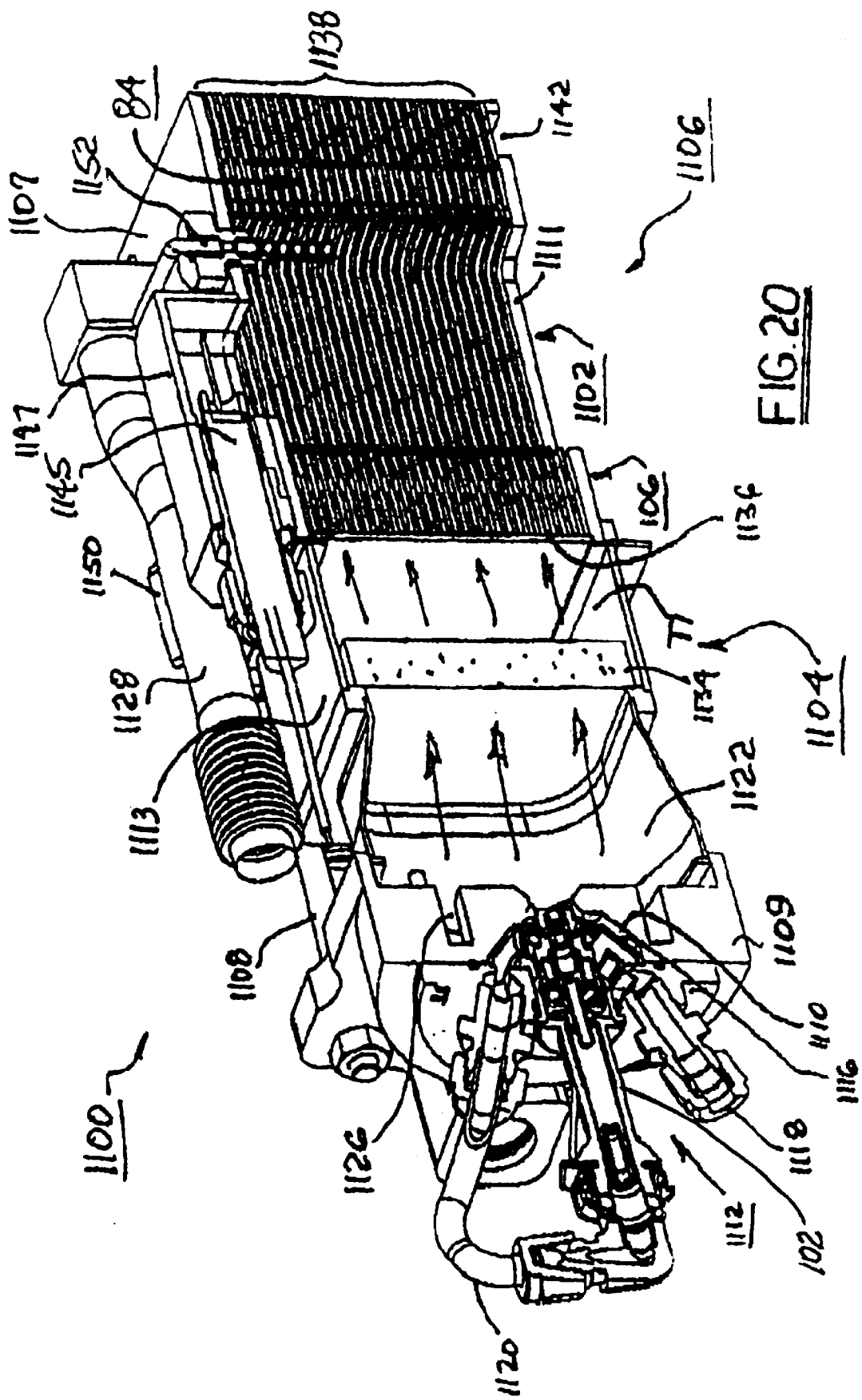
FIG. 20 is an isometric view from above of an elevational longitudinal section of the reforWER system shown in FIG. 19.
Figure 21:
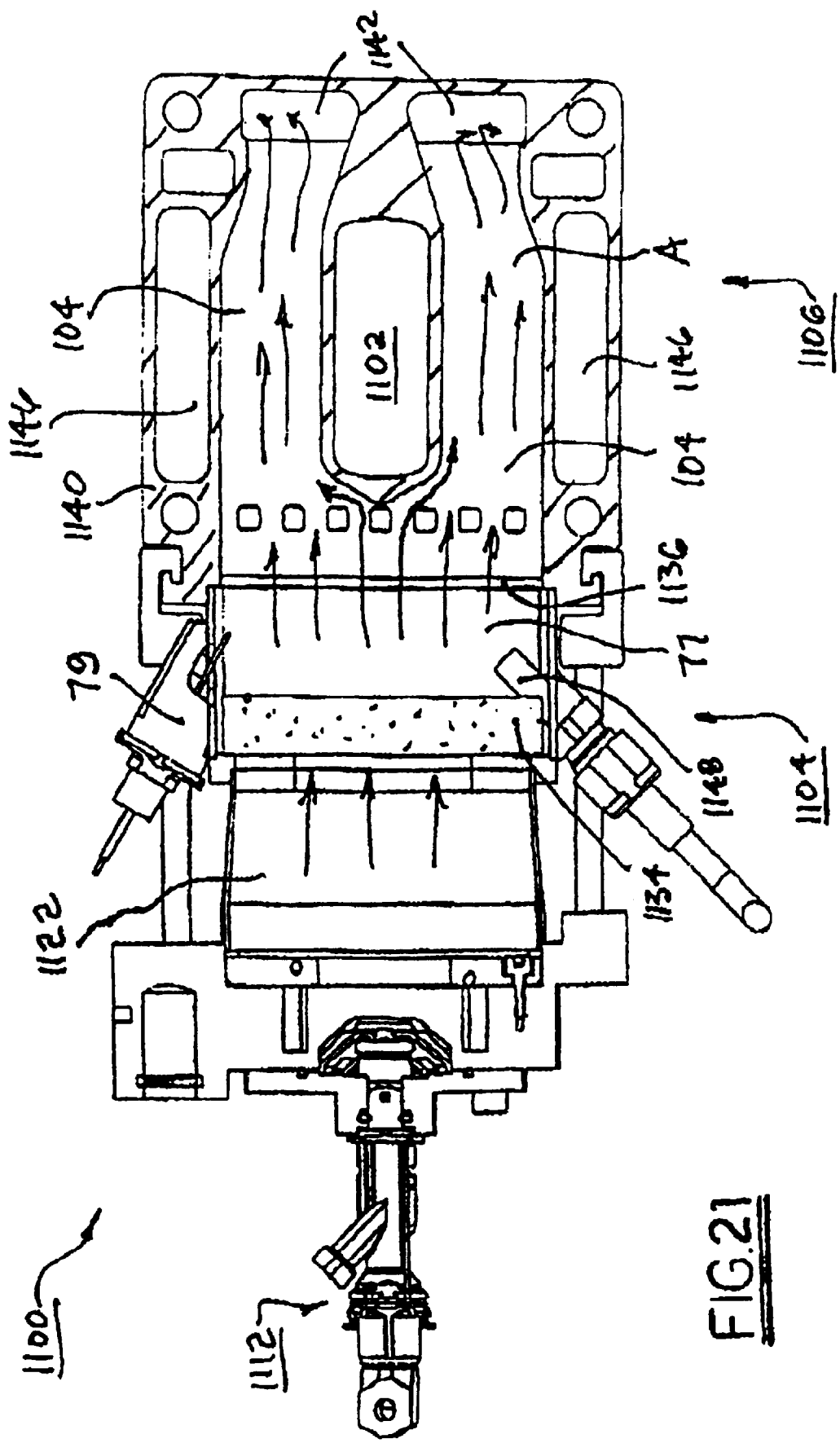
FIG. 21 is a plan view of a first horizontal section of the reforWER system shown in FIG. 19, showing the path of fuel reformation through the system.
Figure 22:
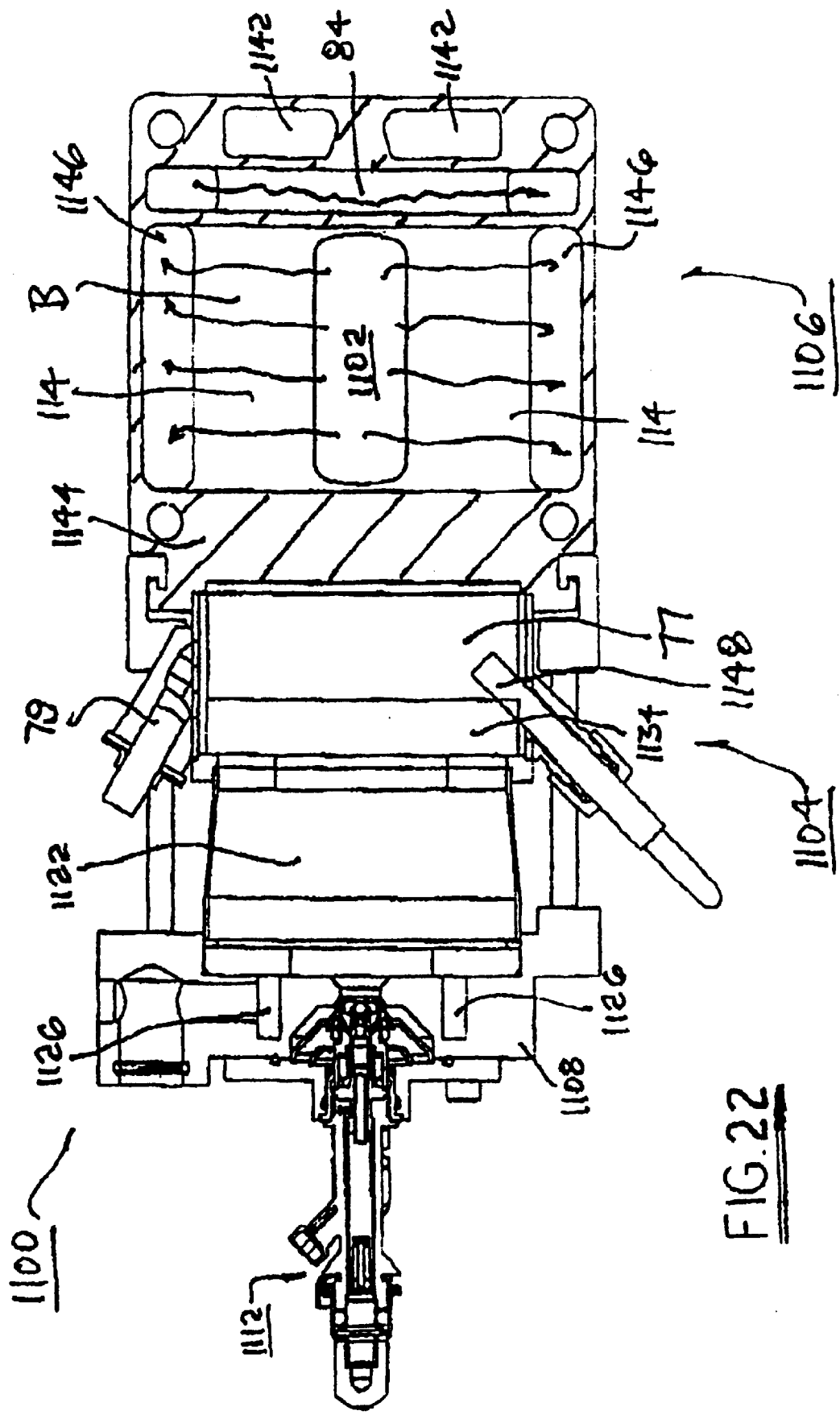
FIG. 22 is a plan view of a second horizontal section of the reforWER system shown in FIG. 19, showing the path of combustor exhaust and exchange of heat through the system.

Bottom plate 502 is the base plate for the manifold and forms the bottom for various chambers formed by combination of plate 502 with lower partitioned element 504, defining a lower distribution element 505, as shown in FIG. 16. Intermediate plate 506 completes the chambers in element 504 and forms the bottom plate for upper partitioned element 508, defining an upper distribution element 509. Top plate 510 completes the chambers in element 508 and forms the mounting base for fuel cell assembly 300, heat exchangers 600, and reforWER unit 1100, as described above.

In operation, air enters a first bottom chamber 512 via coupling 902-1, flows upwards through slots 514-1,514-2, 514-3 into heat exchanger 600-1, through the heat exchanger conventionally where the air is heated as described below, downwards through slot 516-3 into a first upper chamber 518, thence through opening 520 in plate 506 into a second lower chamber 522. In chamber 518, the heated air is controllably mixed with cool air entering the chamber via bypass bellows insulator coupling 904-1 from air supply assembly 900. The tempered air flows upwards from chamber 522 through opening 524 in plate 506 into a chamber 526 which defines a cathode supply plenum for supplying reaction and cooling air upwards through slotted openings 528 to the cathode air flow passages in stack 344. Spent air is returned from the cathodes via slotted openings 530 into a cathode return plenum 532 and flows downwards through an opening 534 in plate 506 into a common cathode air return runner 536 leading into a tail-gas combustor 1102 within reforWER 1100.

Hot reformate from reforWER 1100 enters manifold 500-1 via opening 538 in top plate 510 and flows into chamber 540, thence downwards through opening 542 into a feed runner 544, and upwards through opening 546 into a chamber 548 defining an anode supply plenum for stack 344.

Preferably, opening 546 defines a seat for a valve having a ball 550 (FIG. 14), preferably held in place by gravity, for allowing flow of reformate during operation but preventing flow of oxygen into the anodes when the system is shut down. Further, preferably, feed runner 544 and/or chamber 548 contains an oxygen-reactive material (not shown here but indicated as 134 in FIG. 2), such as nickel wool, through which reformate may easily pass but which can scavenge any oxygen passing by ball 550 on its way to the anodes.

Preferably, lower chamber 522 and feed runner 544 are configured to maximize the area of the common wall between them, such that chamber 522 and runner 544 define a co-flow heat exchanger which tends to decrease the temperature difference between the cathode supply air and the anode supply reformate.

From chamber 548, reformate flows upwards through slots 552 into the anode flow passages in stack 344. Spent reformate ("tail gas") flows downwards through slots 554 into an anode return plenum 556 and thence downwards through opening 558 into a reformate return runner 560. From runner 560, spent reformate flows upwards through opening 562 into elongate chamber 564 common with manifold 500-2 and thence through openings 566 into the tail-gas combustor 1102 in reforWER 1100. Preferably, opening 562 is also formed as a check valve seat like opening 546 for receiving a check ball 563 preferably held in place by gravity for preventing reverse flow of oxygen into the anodes when the system is shut down. Further, preferably, plenum 556 and/or runner 560, like chamber 548, contains an oxygen-reactive material (not shown here but indicated as 134 in FIG. 2), such as nickel wool, through which the tail gas may easily pass but which can scavenge any oxygen passing by ball 563 on its way to the anodes.

Burned tail gas from the combustor enters manifold 500-1 via slot 568-3 and flows via slots 568-2,568-1 into bottom chamber 570 and thence through opening 572 into chamber 574 which acts as a supply plenum for cathode air heat exchanger 600-1. Burned tail gas flows upward from chamber 574 through openings 576 and through heat exchanger 600-1, thus heating incoming cathode air, returning through openings 578 into chamber 580 and thence via openings 582 into a tempering jacket space 354 (FIG. 7) surrounding stack 344 between the fuel cells 311 and cover 342. The stack is thus tempered by the exhaust gas. The burned tail gas returns from jacket 354 via openings 584 into an exhaust plenum comprising openings 586-3,586-2,586-1 which is vented to the atmosphere by exhaust pipe 588 and pipe flange 590.

Referring to FIGS. 19 through 22, a reforWER 1100 in accordance with the system is mounted on the upper surface of plate 510 (FIG. 18) over opening 566 and slot 568-3 in manifold portions 500-1,500-2, as described below. ReforWER 1100 is generally laid out having a first portion 1104 for receiving, metering, and mixing liquid fuel and air, for vaporizing the fuel/air mixture, and for passing the vaporized mixture into a second portion 1106 for partially oxidizing the fuel in the mixture catalytically and passing the reformed fuel into manifold assembly 500. Portions 1104, 1106 are preferably joined by through bolts 1108. Portion 1106 also houses tail gas combustor 1102 as described below.

For clarity in the following description, the item numbers as originally shown in FIG. 2 are used, where appropriate, in FIGS. 19–22 in relating the flow paths and controls shown schematically in FIG. 2 to the actual apparatus shown in FIGS. 19–22; otherwise, numbers relating to reforWER 700 are in the 7xx series.

Referring to portion 1104, a fuel injection head 1109 has an axial bore 1110 for receiving a fuel injector assembly 1112 comprising a fuel injector 102 which may be similar to fuel injectors provided on conventional internal combustion engines. Assembly 1112 further comprises an annular heat exchanger 1116. Fuel is supplied by fuel pump 94 (FIG. 2) to entry fitting 11 18 which communicates with exchanger 1116, wherein the fuel is preheated, and then is fed by hose 1120 to injector 102. Preheating of the fuel also acts to cool the fuel injector and is a first waste energy recovery feature in accordance with the invention. Fuel is injected periodically, responsive to control system 200, into a mixing chamber 1122 adjacent head 1109.

Air is supplied to reforWER 1100 from air pump 48 via line 74 past MAF 78 and through control valve 80, entering via T-fitting 1124 (omitted from FIG. 20 for clarity but shown in FIG. 19) wherein the air flow is divided into two portions. A first air flow passes through control valve 82 and directly into a distribution header 1126 formed in head 1109 for admission into mixing chamber 1122. A second air flow passes through feed tube 1128 along the length of reforWER 1100, thence through a pre-heat heat exchanger 84 formed in portion 1106 adjacent combustor 1102, and returns through tube 1132 to header 1126 to be admitted to mixing chamber 1122. Regulation of control valve 82 controls air flow through exchanger 84 and hence the average temperature of air entering the mixing chamber. Exchanger 84 is a second waste energy recovery feature in accordance with the invention.

In mixing chamber 1122, the injected fuel is vaporized and turbulently mixed with both air portions. The mixed vapor is passed through a porous "mixing foam" 1134 into a start-up combustor chamber 77 provided with a mixed vapor ignition means, preferably an igniter 79. Warm-up of system 1000 is shortened by igniting mixed vapor in chamber 77, responsive to control system 200, and passing the hot combustion products forward directly through the plates in reformer 106 and the anodes in stacks 44,46. Igniter 79 is not used in normal operation at elevated temperature, and a porous flame arrester 1136 prevents flashback from the reformer 106 into chamber 77.

ReforWER second portion 1106 is essentially a plate reformer 106 and heat exchanger encased in a metal enclosure 1107 which sealable mates with the wall 1113 of chamber 77. Further, portion 1106 preferably includes a sturdy bottom plate 1111 for mounting against plate 510 in manifold assembly 500. Portion 1106 comprises a plurality of preferably identical reformer plates 1138, each of which is coated on one side, designated here for clarity as side A (FIG. 21), with a hydrocarbon-reforming catalyst. Plates 1138 are coated on opposite side B (FIG. 22) with a catalytic washcoat for reduced CO and hydrocarbon emissions from combustor 1102. The plates are stacked in alternating order such that each side A faces another side A and each side B faces another side B.

Sides A are separated by sealing reformer spacers 1140 (FIG. 21) such that a reforming space is created between each pair of sides A. Mixed vapor flows across the catalyst on sides A, is reformed to reformate fuel, and passes through reformate ducts 1142 formed by cooperation of the plates and spacers, which ducts engage opening 538 in manifold assembly 500 (FIG. 13) for conveying reformate to the fuel cell stacks as described above.

Sides B are separated by sealing combustor spacers 1144 (FIG. 22) such that a combustion exhaust space is created between each pair of sides B. Spacers 1144 prevent cross-contamination of reformate with exhaust. Tail gas from the anodes in the stacks is fed to combustor 1102 from manifold assembly 500 as described above, and is ignited periodically by an igniter 1145 disposed in a head housing 1147 defining an upper end of combustor 1102. Exhaust from combustor 1102 flows across sides B, heating plates 1138 from side B and thus enhancing the fuel reforming proceeding on side A, and passes through exhaust ducts 1146 formed by cooperation of the plates and spacers, which ducts engage slots 568-3 in manifold assembly 500 (FIG. 13) for conveying combustor exhaust to cathode air heat exchangers 600-1, 600-2 as described above. Exchange of combustor heat between sides B and A is a third waste energy recovery feature in accordance with the invention.

Preferably, reforWER 1100 includes a first temperature sensor 1148 disposed in chamber 77 for sensing the temperature of mixed vapor entering the reformer; a second temperature sensor 1150 disposed in one of exhaust ducts 1146 for sensing the temperature of the combustor exhaust after heat loss to the reformer; a third temperature sensor 1152 disposed within combustor 1102 for sensing the combustion temperature; and a fourth temperature sensor 1154 disposed in one of reformate ducts 1142 for sensing the temperature of reformate leaving the reforming unit 1100.

Thus reforWER 1100 is seen to be an integrated reforming unit comprising a hydrocarbon fuel reformer; an integral tail gas and cathode air combustor and reformer heat exchanger; a fuel pre-heater and fuel injector cooler; a fuel injector and fuel/air mixer and vaporizer; a reforming air pre-heater; a reforming air temperature control valve and means; and a pre-reformer start-up combustor. The integration of a plate reformer, tail gas combustor, and combustor gas heat exchanger allows for efficient operation modes of the reformer. Specifically, the reformer may be operated in an endothermic mode (steam reforming, as is known in the art, but not shown) wherein the combustor gas heat exchanger and combustor provide the energy for the reforming function. In exothermic reforming mode, as discussed herein, the combustor gas heat exchanger aids in the temperature regulation of the reformer and reduces significant thermal gradients in the unit.

Referring to FIGS. 2,10, 23, and 24, an air supply system 900 for fuel cell system 1000 is shown. As in the reforWER description and figures above, numbers from FIG. 2 will be used where appropriate; otherwise, elements of system 900 are indicated by 9xx numbers.

A conventional high speed inlet air pump 48 draws inlet air 50 through an air filter 52, past a first MAF sensor 54, through a sonic silencer 56 which may be a resonance chamber, and through a cooling shroud 58 surrounding pump 48.

Air output 60 from pump 48, at a pressure sensed by pressure sensor 61, is conveyed via inlet 906 into a manifold block 908 having a central plenum 910. A first feed from plenum 910 is conveyed as combustor cooling air 64, via a second MAF sensor 68 and control valve 70 disposed in block 908. Cooling air 64 enters manifold assembly 500 via a flexible bellows insulator coupling 912 (FIG. 13) and is mixed therein with spent cathode air in cathode air return 536 (FIG. 16) and passed to combustor 1102 as described above. A second feed from plenum 910 is conveyed as reformer air feed 74 to hydrocarbon fuel vaporizer 76 via a third MAF sensor 78 and reformer air control valve 80.

Cathode air feed 75 from plenum 910 is controlled by cathode air control valve 86, is divided into flows 75-1 and 75-2, and is sent as the primary cathode air flows to cathode air heat exchangers 600-1,600-2 via flexible couplings 902-1, 902-2, respectively, as described above. Cathode bypass air feed 87 from plenum 910 is also divided into two flows 87-1,87-2 and is sent as the bypass cathode air flows via flexible connectors 904-1,904-2, respectively, for combination in manifold assembly 500 with heated cathode air flows from heat exchangers 600-1,600-2, as described above. Varying the volume of air passing through control valve 88 varies the temperature of the cathode air sent to the stacks.

Integrated air supply system 200 thus provides and controls all the air flows required in system 1000.

An SOFC system 1000 in accordance with the invention is especially useful as an auxiliary power unit (APU) 1000-1 for vehicles 136 (shown schematically in FIG. 12) on which the APU may be mounted, such as, for example, cars 136-1 and trucks 136-2, boats and ships 136-3, and airplanes 136-4, wherein motive power is supplied by a conventional engine and the auxiliary electrical power needs are met by an SOFC system.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for generating electric power by combination of oxygen with hydrogen-containing fuel, comprising:
   a) a plurality of individual fuel cells organized into at least one fuel cell stack assembly including a plurality of cathodes and anodes;
   b) manifold means having passageways for conveying said fuel and said oxygen in the form of air to said stack assembly and passageways for returning spent cathode air and tail gas from said stack assembly;
   c) an integrated reformer and tail gas combustor connected to said manifold means for reforming hydrocarbons to provide said fuel to said stack assembly and for combusting tail gas returned from said stack assembly; and
   d) an integrated air supply system for controllably supplying air to said stack assembly, said reformer and said combustor via said manifold means.

2. A fuel cell system in accordance with claim 1 wherein said air supply system comprises:
   a) at least one air pump for pressurizing intake air into an output air stream;
   b) a distribution manifold for receiving said output air stream and distributing said air stream among said passagways; and
   c) a plurality of control valves disposed in said manifold for regulating flows through said passageways to said stack assembly, said reformer, and said combustor.

3. A fuel cell system in accordance with claim 2 further comprising a control system, wherein the action of said control valves is controlled by said control system.

4. A fuel cell system in accordance with claim 3 wherein said air supply system further includes an enclosure for housing and cooling said control system.

5. A fuel cell system in accordance with claim 1 wherein said air supply system further includes at least one mass air flow sensor for measuring at least a portion of the air mass flowing through said air supply system.

6. A fuel cell system in accordance with claim 1 wherein said system is configured for being mounted on a vehicle.

7. A fuel cell system in accordance with claim 1, wherein said fuel cell system is configured for being mounted on at least one of a car, truck, boat, and airplane.

8. A fuel cell system in accordance with claim 6, wherein said system is an auxiliary power unit for said vehicle.

9. An automotive vehicle, comprising a fuel cell system for generating auxiliary power for said vehicle, said system including
   a plurality of individual fuel cells organized into at least one fuel cell stack assembly including a plurality of cathodes and anodes,
   manifold means having passageways for conveying said fuel and said oxygen in the form of air to said stack assembly and passageways for returning spent cathode air and tail gas from said stack assembly;
   an integrated reformer and tail gas combustor unit connected to corresponding passageways of said manifold means for reforming hydrocarbons to provide said fuel to said stack assembly and for combusting tail gas returned from said stack assembly; and
   an integrated air supply system for controllably supplying air to said stack assembly, said reformer and said combustor via said manifold means.

10. A fuel cell system for generating electric power by combination of oxygen with hydrogen-containing fuel, comprising:
    a stack housing, at least one fuel cell stack assembly disposed within said stack housing, a plurality of stack housing inlets and stack housing outlets defined by said stack housing;
    manifold means having passageways in fluid communication with corresponding stack housing inlets for conveying said fuel and said oxygen to said stack assembly, and passageways in fluid communication with corresponding stack housing outlets for conveying spent cathode air and tail gas from said stack assembly;
    an integrated reformer and tail gas combustor unit connected to said manifold means for reforming hydrocarbons to provide said fuel to said stack assembly and for combusting tail gas returned from said stack assembly; and
    an integrated air supply system for controllably supplying air to said stack assembly, said reformer and said combustor via said manifold means.

11. The fuel cell system of claim 10, wherein said manifold means comprises at least one manifold housing, said at least one manifold housing defining at least in part said passageways, said at least one manifold housing being attached to said stack housing.

* * * * *